(12) United States Patent
Jeon et al.

(10) Patent No.: US 11,874,689 B2
(45) Date of Patent: Jan. 16, 2024

(54) PERIPHERAL COMPONENT INTERCONNECT EXPRESS (PCIE) DEVICE FOR SUPPORTING SEPARATE REFERENCE CLOCK(S) OPERATING BETWEEN HOST AND DIRECT MEMORY ACCESS (DMA) CONTROLLER

(71) Applicant: SK hynix Inc., Icheon-si (KR)

(72) Inventors: Yong Tae Jeon, Icheon-si (KR); Ji Woon Yang, Icheon-si (KR); Dae Sik Park, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/749,133

(22) Filed: May 19, 2022

(65) Prior Publication Data

US 2022/0382696 A1    Dec. 1, 2022

(30) Foreign Application Priority Data

May 26, 2021  (KR) .......................... 10-2021-0067690
Jun. 1, 2021   (KR) .......................... 10-2021-0070676
Jun. 1, 2021   (KR) .......................... 10-2021-0070762

(51) Int. Cl.
*G06F 13/28*         (2006.01)
*G06F 13/42*         (2006.01)

(52) U.S. Cl.
CPC .......... *G06F 13/28* (2013.01); *G06F 13/4221* (2013.01); *G06F 2213/0026* (2013.01)

(58) Field of Classification Search
CPC ................. G06F 13/28; G06F 13/4221; G06F 2213/0026
See application file for complete search history.

(56) References Cited

U.S. PATENT DOCUMENTS 7,191,255 B2     3/2007  Wong et al.
10,366,044 B2 *  7/2019  Choi .................... G06F 1/266
10,503,679 B2   12/2019  Huang
(Continued)

FOREIGN PATENT DOCUMENTS

KR   10-2014-0113571 B1   9/2014
KR      10-1565357 B1     9/2014
(Continued)

OTHER PUBLICATIONS

Non-Final Rejection of U.S. Appl. No. 17/526,995 from USPTO dated Oct. 6, 2022.

(Continued)

*Primary Examiner* — Tammara R Peyton

(57) ABSTRACT

A Peripheral Component Interconnect Express (PCIe) interface device may include a PCIe layer, a link training module, a PCIe register, and a PCIe controller. The PCIe layer may perform communication between a host and a Direct Memory Access (DMA) device. The link training module may perform a link training for the host. The PCIe register may store data information on the PCIe layer. The PCIe controller may switch an operating clock from a PCIe clock, generated based on a reference clock, to an internal clock, process data of the PCIe layer on the basis of the internal clock, and control the link training module to recover a link for the host, when a reset signal received from the host is asserted or the reference clock is off.

23 Claims, 29 Drawing Sheets

(56) References Cited

U.S. PATENT DOCUMENTS

| | | |
|---|---|---|
| 10,713,209 B2 * | 7/2020 | Jen .................... G06F 13/4282 |
| 2006/0090014 A1 | 4/2006 | Wong |
| 2012/0166699 A1 | 6/2012 | Kumar |
| 2014/0189427 A1 | 7/2014 | Jayaprakash Bharadwaj |
| 2015/0370683 A1 | 12/2015 | Nishiyama |
| 2016/0267048 A1 | 9/2016 | Pethe et al. |
| 2017/0357609 A1 | 12/2017 | Long |
| 2018/0349310 A1 | 12/2018 | Koriginja Ramaswamy |
| 2019/0303342 A1 | 10/2019 | Jen et al. |
| 2020/0226084 A1 | 7/2020 | Das Sharma |
| 2020/0349064 A1 | 11/2020 | Lim |
| 2021/0073157 A1 | 3/2021 | Olarig |
| 2021/0318815 A1 | 10/2021 | Olarig |
| 2022/0342841 A1 | 10/2022 | Choudhary |
| 2022/0382706 A1 | 12/2022 | Jeon |

FOREIGN PATENT DOCUMENTS

| | | |
|---|---|---|
| KR | 10-2018-0037783 A | 4/2018 |
| KR | 10-2018-0095765 A | 8/2018 |
| KR | 10-2020-0010139 A | 1/2020 |

OTHER PUBLICATIONS

"PCI Express® Base Specification Revision 4.0 Version 1.0", Sep. 27, 2017.
"PCI Express® Base Specification Revision 5.0 Version 1.0", May 22, 2019.
Non-Final Rejection of U.S. Appl. No. 17/527,032 from USPTO dated Feb. 8, 2023.

* cited by examiner

US 11,874,689 B2

PERIPHERAL COMPONENT INTERCONNECT EXPRESS (PCIE) DEVICE FOR SUPPORTING SEPARATE REFERENCE CLOCK(S) OPERATING BETWEEN HOST AND DIRECT MEMORY ACCESS (DMA) CONTROLLER

CROSS-REFERENCE TO RELATED APPLICATION

The present application claims priority under 35 U.S.C. § 119(a) to Korean patent application number 10-2021-0070676, filed on Jun. 1, 2021, Korean patent application number 10-2021-0067690, filed on May 26, 2021, and Korean patent application number 10-2021-0070762, filed on Jun. 1, 2021, which are incorporated herein by reference.

BACKGROUND

1. Technical Field

Various embodiments generally relate to an electronic device, and more particularly, to a Peripheral Component Interconnect Express (PCIe) device and a method of operating the PCIe device.

2. Related Art

Peripheral Component Interconnect Express (PCIe) refers to an interface with a serial configuration for data communication. A PCIe-based storage device may support multi-port and multi-function. A PCIe-based storage device may be virtualized or non-virtualized and achieve Quality of Service (QoS) of host I/O commands through at least one PCIe function.

A storage device may store data under the control of a host device such as a computer or a smart phone. A storage device may include a memory device storing data and a memory controller controlling the memory device. Memory devices may be divided into volatile memory devices and non-volatile memory devices.

A volatile memory device may retain data as long as power is being supplied, and may lose stored data in the absence of power supply. Types of volatile memory devices may include Static Random Access Memory (SRAM), Dynamic Random Access Memory (DRAM), and the like.

A non-volatile memory device does not lose data even in the absence of power supply. Types of non-volatile memory devices may include Read Only Memory (ROM), Programmable ROM (PROM), Electrically Programmable ROM (EPROM), Electrically Erasable and Programmable ROM (EEPROM), flash memory, and the like.

SUMMARY

Various embodiments of the present disclosure are directed to a PCIe interface device completing processing of a command when a link down that is not intended by a host occurs, and methods of operating the PCIe device.

According to an embodiment, a Peripheral Component Interconnect Express (PCIe) interface device may include a transaction layer generating a transaction packet for transmission of a transaction, a data link layer generating a link packet including a protection code and a sequence number for the transaction packet on the basis of the transaction packet, a physical layer generating a physical packet on the basis of the link packet and sequentially outputting the physical packet, a link training module performing negotiation for a link coupled through the physical layer and maintaining data information based on whether a link down occurring when the negotiation for the link is not performed is requested by a host or not, and a PCIe register storing information about the transaction layer, the data link layer, the physical layer, and the link training module.

According to an embodiment, a method of operating a Peripheral Component Interconnect Express (PCIe) interface device may include generating, by a transaction layer, a transaction packet to transmit a transaction, generating, by a data link layer, a protection code for the transaction packet and a link packet including a sequence number on the basis of the transaction packet, generating, by a physical layer, a physical packet on the basis of the link packet, and sequentially outputting the physical packet, performing negotiation for a link coupled through the physical layer by transmitting and receiving the physical packet, and maintaining data information based on whether a link down occurring when the negotiation for the link is not performed is requested by the host or not.

According to an embodiment, a Peripheral Component Interconnect Express (PCIe) device may include a first port linking up with a first host using a first link, a second port linking up with the first host or a second host using a second link, and a port mode controller controlling the first port and the second port to change an operating mode from a dual port mode, in which the first port and the second port operate independently of each other, to a single port mode in which only the first port operates, wherein the port mode controller controls the second port to reset the second link in a state where the first link is linked up.

According to an embodiment, a Peripheral Component Interconnect Express (PCIe) device may include a first port linking up with a first host using a first link, a second port linking up with the first host or a second host using a second link, and a port mode controller controlling the first port and the second port to change an operating mode from a single port mode, in which only the first port operates, to a dual port mode in which the first port and the second port operate independently of each other, wherein the port mode controller controls the second port to perform a link training operation to link up the second link in a state where the first link is linked up.

According to an embodiment, a method of operating a Peripheral Component Interconnect Express (PCIe) device including a first port and a second port may include performing a first link training operation to link up a first host with a first link of the first port, operating in a single port mode when the first link training operation is completed, performing a lane reduce operation to reduce a lane corresponding to the first link in response to a mode change request received from the first host, and performing a second link training operation to link up a second host with a second link of the second port when a status of the first link is an L0 state.

According to an embodiment, a method of operating a Peripheral Component Interconnect Express (PCIe) device including a first port and a second port may include performing a first link training operation to link up a first host with a first link of the first port and a second link training operation to link up a second host with a second link of the second port, operating in a dual port mode, in which the first link and the second link operate independently of each other, when the first link training operation and the second link training operation are completed, deactivating the second link in response to a mode change request received from the first host or the second host, and performing a lane increase operation to increase a lane corresponding to the first link when the deactivation of the second link is completed.

According to an embodiment, a Peripheral Component Interconnect Express (PCIe) interface device may include a PCIe layer performing communication between a host and a Direct Memory Access (DMA) device, and a PCIe controller switching an operating clock from a PCIe clock, generated based on a reference clock, to an internal clock, processing data of the PCIe layer on the basis of the internal clock, and recovering a link with respect to the host, when a reset signal received from the host is asserted or the reference clock is off.

According to an embodiment, a method of operating a Peripheral Component Interconnect Express (PCIe) interface device including a PCIe layer performing communication between a host and a Direct Memory Access (DMA) device may include switching an operating clock from a PCIe clock, generated based on a reference clock, to an internal clock, when a reset signal received from the host is asserted or the reference clock is off, flushing data of the PCIe layer on the basis of the internal clock, and processing a transaction with respect to the DMA device.

According to an embodiment, a Peripheral Component Interconnect Express (PCIe) interface device may include a PCIe layer, a link training module, a PCIe register, and a PCIe controller. The PCIe layer may perform communication between a host and a Direct Memory Access (DMA) device. The link training module may perform a link training for the host. The PCIe register may store data information on the PCIe layer. The PCIe controller may switch an operating clock from a PCIe clock, generated based on a reference clock, to an internal clock, process data of the PCIe layer on the basis of the internal clock, and control the link training module to recover a link for the host, when a reset signal received from the host is asserted or the reference clock is off.

According to an embodiment, a Peripheral Component Interconnect Express (PCIe) device may include a first port, a second port and a port mode controller. The first port may communicate with a first host through a first link. The second port may communicate with the first host or a second host through a second link. The port mode controller may control the first port and the second port to change an operating mode between a single port mode in which only the first port operates and a dual port mode in which the first port and the second port operate independently of each other. The port mode controller may control the second port to perform a link training for linking up the second link or to reset the second link in a state where the first link is linked up.

DETAILED DESCRIPTION

Specific structural or functional descriptions of examples of embodiments in accordance with concepts that are disclosed in this specification are illustrated only to describe the examples of embodiments in accordance with the concepts. Examples of embodiments in accordance with the concepts may be carried out in various forms, however, and the descriptions are not limited to the examples of embodiments described in this specification.

Figure 1:
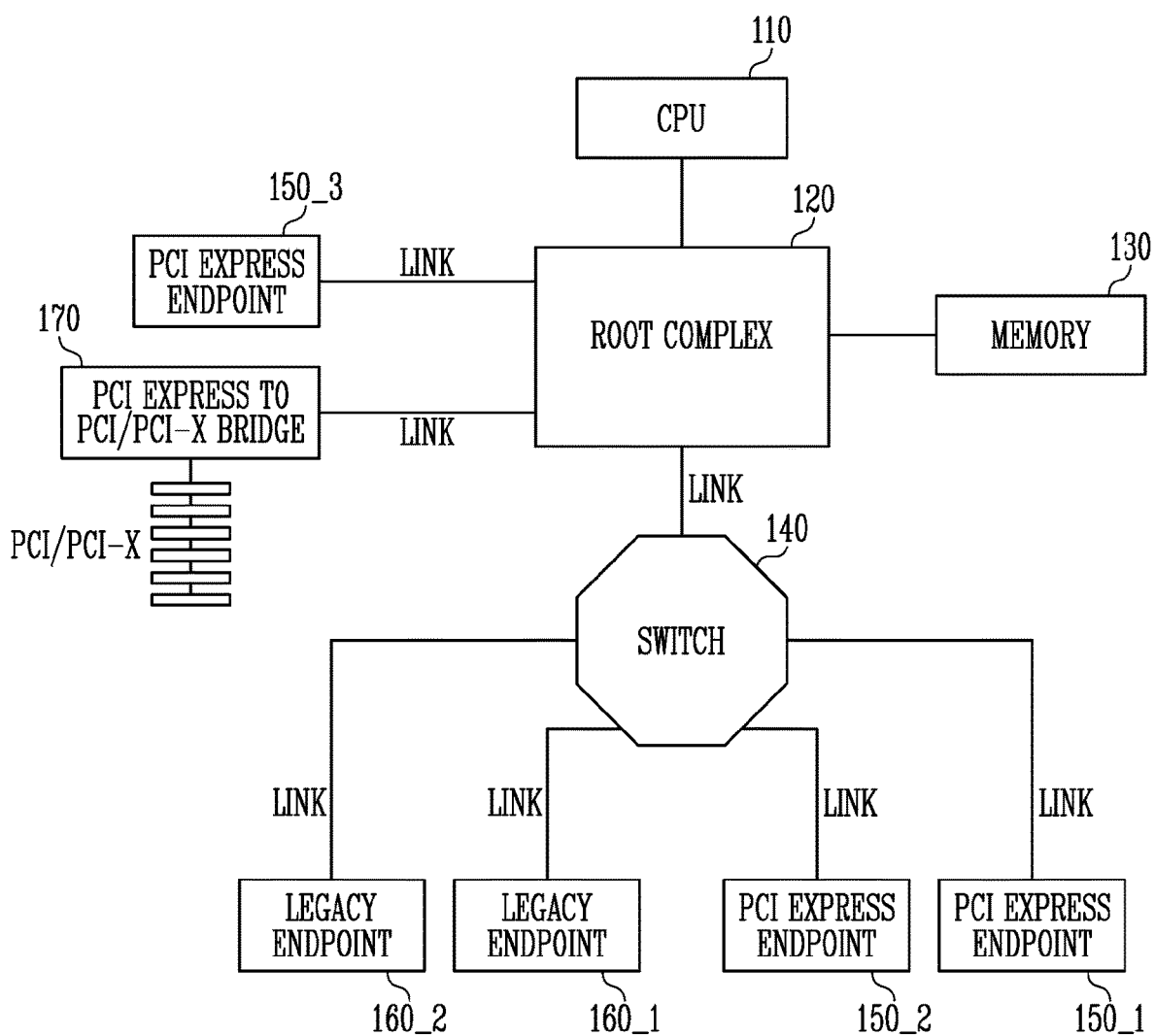
FIG. 1 is a block diagram illustrating a PCIe system according to an embodiment of the present disclosure.

FIG. 1 is a block diagram illustrating a peripheral component interconnect express (PCIe) system according to an embodiment of the present disclosure.

Referring to FIG. 1, a PCIe system 100 may include a central processing unit (CPU) 110, a root complex 120, a memory 130, a switch 140, PCIe endpoints 150_1 to 150_3, legacy endpoints 160_1 and 160_2, and a PCIe to PCI/PCI-X bridge 170.

In FIG. 1, the root complex 120 may be coupled to each of the switch 140, the PCIe endpoints 150_1 to 150_3 and the PCIe to PCI/PCI-X bridge 170 through a link. In an embodiment, the switch 140 may be coupled to each of the PCIe endpoints 150_1 to 150_3 and the legacy endpoints 160_1 and 160_2 through a link. A link may include at least one lane.

According to an embodiment, the root complex 120 may connect the CPU 110 and the memory 130 to an input/output (I/O) hierarchy.

More specifically, the root complex 120 may support a PCIe port. In other words, the root complex 120 may support a root port that may be coupled to an input/output (I/O) device.

In an embodiment, the root complex 120 may support interlayer routing of each configuration included in the PCIe system 100. Routing may refer to an operation of selecting a path from a transmission side to a reception side in data communication. Routing may be performed using a method of setting a path in advance from a transmission side to a reception side or a method of selecting a path with the highest efficiency according to a status of a system or a network.

In an embodiment, the root complex 120 may support input/output (I/O) requests. The root complex 120 may support generation of configuration requests. The root complex 120 may support generation of locked requests as a requester.

According to an embodiment, the root complex 120 may split a packet into smaller packets transmitted between hierarchies. In an embodiment, the root complex 120 may generate I/O requests.

In an embodiment, the root complex 120 may be a root hub, a controller hub, or a root controller in a PCIe interconnection architecture. For example, the root complex 120 may include a chipset, a memory controller hub (MCH), a northbridge, an interconnect controller hub (ICH), a southbridge, and a root controller/hub. In addition, the root complex 120 may connect the CPU 110 and the memory 130 to an I/O hierarchy. The root complex 120 may support peer-to-peer (P2P) routing. The root complex 120 may include at least one host bridge and root port. The root complex 120 may support at least one PCIe port.

The memory 130 may store data, commands or program codes necessary for operations of the PCIe computing system 100. According to an embodiment, the memory 130 may store program codes that are operable to execute one or more operating systems (OS) and virtual machines (VM), and program codes that execute a virtualization intermediary (VI) for managing the virtual machines (VM). In addition, the memory 130 may be realized as a volatile memory device such as DRAM or SRAM.

According to an embodiment, the switch 140 may include two or more logical PCI-to-PCI bridges. Each of the two or more logical PCI-to-PCI bridges may be coupled to an upstream port or a downstream port.

The switch 140 may transmit a transaction using a PCI bridge mechanism (address-based multicasting). The switch 140 may transmit all types of transaction layer packets (also referred as transaction packets) (TLPs) through the upstream port and the downstream port. In an embodiment, the switch 140 may support locked requests. Each port of the enabled switch 140 may support flow control. The switch 140 may implement arbitration using round robin or weighted round robin schemes when contention occurs on the same virtual channel.

According to an embodiment, The switch 140 may route packets or messages upstream or downstream. More specifically, the switch 140 may route packets or messages up a hierarchy toward the root complex 120 from a PCIe endpoint (e.g., 150_1). Alternatively, however, the switch 140 may route packets or messages down a hierarchy away from the root complex 120 toward a PCIe endpoint (e.g., 150_2).

The switch 140 may be referred to as a logic assembly of a plurality of virtual PCI-to-PCI bridge devices. Examples of devices that are connected to the switch 140 may include any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices.

According to an embodiment, each of the PCIe endpoints 150_1 to 150_3 and the legacy endpoints 160_1 and 160_2 may serve as a requester or a completer of a PCIe transaction. Transaction layer packets (TLPs), which are transmitted or received by the PCIe endpoints 150_1 to 150_3 and the legacy endpoints 160_1 and 160_2, may provide configuration space headers. In an embodiment, each of the PCIe endpoints 150_1 to 150_3 and the legacy endpoints 160_1 and 160_2 may provide a configuration request as a completer.

According to an embodiment, the PCIe endpoints 150_1 to 150_3 and the legacy endpoints 160_1 and 160_2 may be classified depending on the possible size of the memory transaction. For example, when a memory transaction exceeding 4 GB is possible, an endpoint may be a PCIe end point (150_1 to 150_3). On the other hand, when a memory transaction exceeding 4 GB is not possible, an endpoint may be a legacy endpoint (160_1 and 160_2). While the PCIe endpoints 150_1 to 150_3 are not permitted to generate I/O requests, the legacy endpoints 160_1 and 160_2 may provide or generate I/O requests.

According to an embodiment, the PCIe endpoint 150_3 may transmit or receive the TLPs to or from the root complex 120. In an embodiment, PCI/PCI-X may transmit or receive the TLPs to or from the root complex 120 through the PCIe to PCI/PCI-X bridge 170. In an embodiment, the PCIe endpoints 150_1 and 150_2 and the legacy endpoints 160_1 and 160_2 may transmit or receive the TLPs to or from the switch 140.

According to an embodiment, the switch 140 may transmit the TLPs received from the PCIe endpoints 150_1 and 150_2 and the legacy endpoints 160_1 and 160_2 to the root complex 120. The switch 140 may transmit the TLPs received from the root complex 120 to the PCIe endpoint 150_3 or the PCI/PCI-X (not illustrated).

According to an embodiment, the root complex 120 may directly transmit or receive TLPs to or from the PCIe endpoint 150_3. The root complex 120 may transmit or receive TLPs to or from the PCIe endpoints 150_1 and 150_2 and the legacy endpoints 160_1 and 160_2 through the switch 140. The root complex 120 may transmit the TLPs received from the PCIe endpoints 150_1 and 150_2 and the legacy endpoints 160_1 and 160_2 to the CPU 110 or the memory 130.

Figure 2:
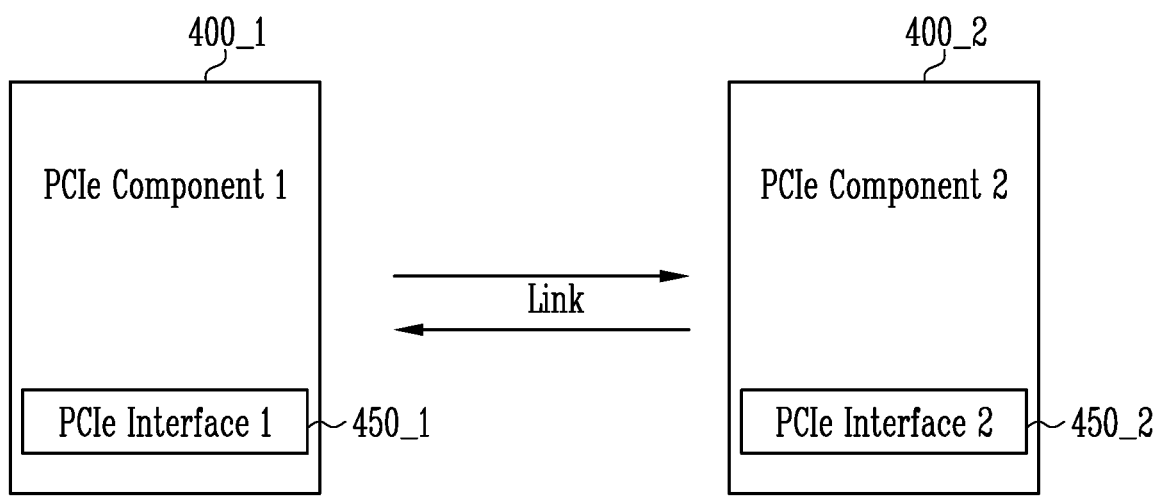
FIG. 2 is diagram illustrating transmission of packets between configurations included in a PCIe device according to an embodiment of the present disclosure.

FIG. 2 is diagram illustrating transmission of packets between configurations included in a PCIe device according to an embodiment of the present disclosure.

Referring to FIG. 2, a PCIe device may include a PCIe interface and be an electronic device that supports transmission and reception using the PCIe interface. The PCIe interface may be referred to as the PCIe interface device. Referring to FIGS. 1 and 2, each of the PCIe component 1 400_1 and PCIe component 2 400_2 may include one of the PCIe endpoints 150_1 to 150_3, the legacy endpoints 160_1 and 160_2, and the PCIe to PCI/PCI-X bridge 170 In other words, each of the PCIe component 1 400_1 and PCIe component 2 400_2 may be one of the components coupled to another component through a link. The link may include at least one lane.

According to an embodiment, the PCIe component 1 400_1 or the PCIe component 2 400_2 may perform communication using a PCIe interface 1 450_1 or a PCIe interface 2 450_2, respectively. More specifically, the PCIe component 1 400_1 may convert data to be transmitted to the PCIe component 2 400_2 into a protocol adapted for communication by using the PCIe interface 1 450_1. According to an embodiment, the PCIe component 1 400_1 and the PCIe component 2 400_2 may form a link. The PCIe component 1 400_1 and the PCIe component 2 400_2 may perform communication through the link. For example, the PCIe component 1 400_1 or the PCIe component 2 400_2 may transmit or receive packets through the link.

According to an embodiment, a packet may be an information transmission unit and consist of selective TLP prefixes, headers and payloads.

According to an embodiment, latency may be reduced by not snooping packets that require no caching. When there is no dependency between transactions, packet operation performance may be improved by changing ordering. In an embodiment, by modifying ordering based on an ID, packet operation performance may be improved.

Figure 3:
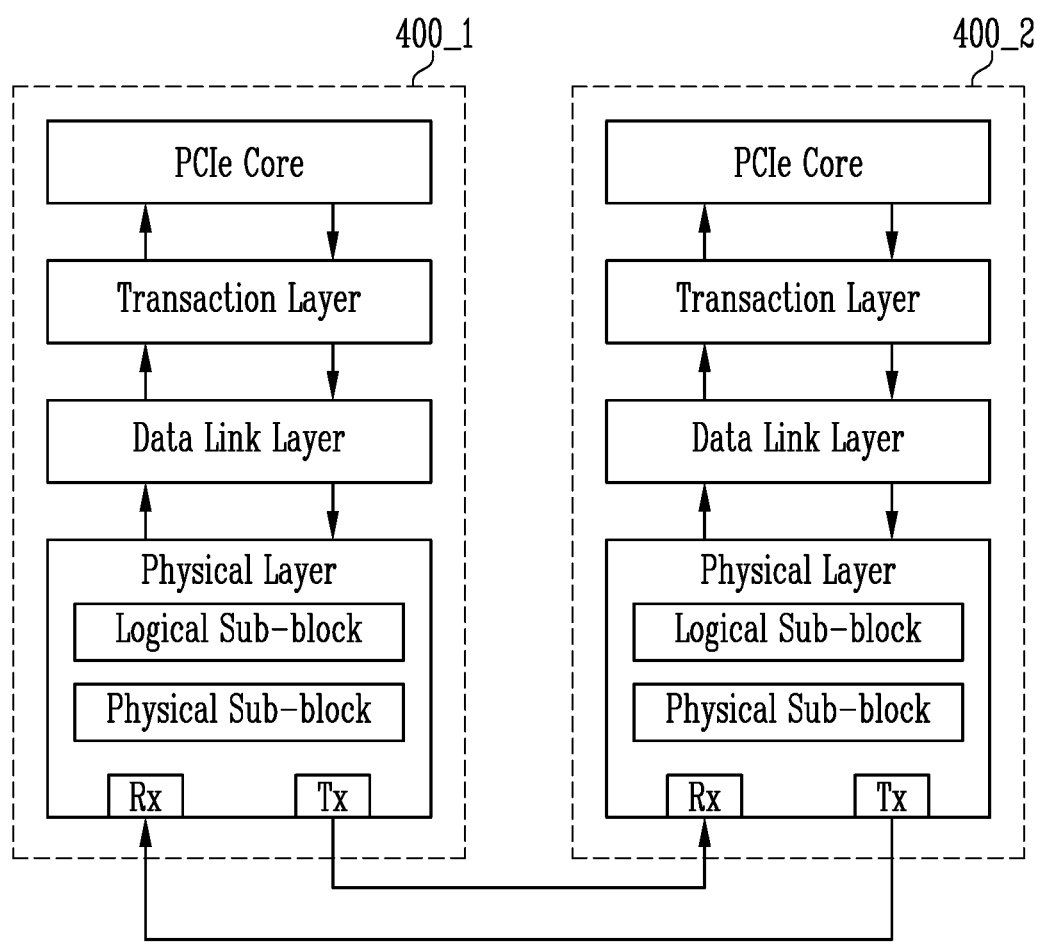
FIG. 3 is a diagram illustrating layers included in a PCIe component according to an embodiment of the present disclosure.

FIG. 3 is a diagram illustrating layers included in a PCIe component according to an embodiment of the present disclosure.

PCIe layers included in the PCIe component may include three discrete logical layers. For example, each of the PCIe component 1 400_1 and the PCIe component 2 400_2 may include a PCIe core, a transaction layer, a data link layer, and a physical layer. Each of the layers may include two sections. More specifically, one section TX may process outbound information (or information to be transmitted), and the other section RX may process inbound information (or information received). According to an embodiment, the PCIe component 1 400_1 may use packets for communicating information with other PCIe components.

The PCIe core may control the entire PCIe component 1 400_1. More specifically, the PCIe core may include a software layer for operating the interface. According to an embodiment, the PCIe core may transfer an address, a transaction type, and data to the transaction layer, or may receive an address, a transaction type, and data from the transaction layer.

The transaction layer may be an upper layer in the architecture of the PCIe component. The transaction layer may assemble and disassemble transaction layer packets (TLPs). According to an embodiment, the transaction layer may implement a split transaction, i.e., a transaction that allows other traffic to be transmitted to a link while a target system assembles data for responses. For example, the transaction layer may implement a transaction in which a request and a response are temporally separated from each other. According to an embodiment, four transaction address spaces may consist of a configuration address space, a memory address space, an input/output address space, and a message address space. A memory space transaction may include at least one of a read request and a write request for transmitting data from/to a memory-mapped location. According to an embodiment, the memory space transaction may use two different address formats, for example, a short address format such as a 32-bit address, or a long address format such as a 64-bit address. A configuration space transaction may be used to access a configuration space of a PCIe device. A transaction directed toward the configuration space may include a read request and a write request. A message space transaction (or message) may be defined to support in-band communication between PCIe devices.

The transaction layer may store link configuration information received from the PCIe core. According to an embodiment, the transaction layer may generate TLPs requested by the PCIe core or may convert the received TLPs into payload or status information.

According to an embodiment, the transaction layers in the PCIe component 1 400_1 and the PCIe component 2 400 may assemble or disassemble transaction layer packets (TLPs). A transaction layer packet (TLP) may be used to process transactions (i.e., a certain type of event) such as transmit, read and write transactions.

The transaction layers may manage credit-based flow control. In an embodiment, the transaction layers may support various formats of addressing depending on the type of the transaction. For example, the transaction layers may support addressing with respect to memory, I/O, configuration, and message.

According to an embodiment, the transaction layers may perform initialization and configuration functions. More specifically, the transaction layers may store link configuration information generated by a processor or a management device. In an embodiment, the transaction layers may store link attributes related to bandwidth and frequency determined by the physical layers.

According to an embodiment, the transaction layers may generate and process packets. More specifically, the transaction layers may generate TLPs requested by a device core and convert the received TLPs into a payload or status information. In an embodiment, the transaction layers may generate cyclic redundancy codes (CRCs) and update the TLP header when end-to-end data integrity is supported.

According to an embodiment, the transaction layers may perform flow control. More specifically, the transaction layers may track flow control credits for TLPs across the link. In an embodiment, the transaction layers may periodically receive the transaction credit status through the data link layers. The transaction layers may control TLP transmission based on flow control information.

According to an embodiment, the transaction layers may implement power management. More specifically, the transaction layers may manage power according to instructions of system software. In an embodiment, when power is turned on, the transaction layers may perform autonomous power management according to instructions of hardware.

According to an embodiment, the transaction layers may provide virtual channel mechanisms and traffic class identification for certain classes of applications. The transaction layers may provide independent logical data flows over predetermined physical resources. In an embodiment, the transaction layers may apply appropriate servicing policies by providing different orderings through packet labeling.

A middle layer in the architecture of the PCIe component may be the data link layer. The data link layer may serve as an intermediate stage between the transaction layer and the physical layer. The primary responsibilities of the data link layer may include link management and data integrity, including error detection and error correction. The data link layers 212 and 222 may generate a link packet including a protection code and a sequence number for the transaction packet and a link packet including a sequence number based on the transaction packet. More specifically, a transmission side of the data link layer may accept the TLPs assembled by the transaction layer, apply a data protection code, or calculate a TLP sequence number. According to an embodiment, the transmission side of the data link layer may transmit the data protection code and the TLP sequence number to the physical layer. A reception side of the data link layer may check the integrity of the TLPs received from the physical layer and transmit the TLPs to the transaction layer for further processing.

According to an embodiment, the responsibilities of the data link layers in the PCIe component 1 400_1 and the PCIe component 2 400 may include link management, data integrity, error detection, and error correction. The data link layers may apply a data protection code and a TLP sequence number to TLPs to be transmitted, and may transmit the data protection code and the TLP sequence number to the physical layers. In an embodiment, the data link layers may check the integrity of the received TLPs from the physical layers and may transmit the TLPs to the transaction layers.

When errors in the TLPs are detected, the data link layers may receive TLPs with no errors, or may request retransmission of TLPs until the link is determined to have a fail status. The data link layers may generate and consume data link layer packets (also referred as link packets) (DLLPs) that are used for link management.

According to an embodiment, the data link layers may exchange reliable information. In an embodiment, the data link layers may perform initialization and power management. More specifically, the data link layers may transmit power status requests of the transaction layers to the physical layers 213 and 223, respectively. In an embodiment, the data link layers may transmit information about enable/disable, reset, disconnection, and power management states to the transaction layers.

According to an embodiment, the data link layers may perform data protection, error checking, and facilitate retry transmissions. More specifically, the data link layers may generate CRCs. In an embodiment, the data link layers may store the transmitted TLPs to enable retry for the TLPs. The data link layers may check the TLPs, transmit retry messages, and display errors for error reporting and logging.

The physical layer may include circuitry for an interface operation. The physical layer may include a driver, an input buffer, a serial-to-parallel conversion circuit, a parallel-to-serial conversion circuit, phase locked loops (PLLs), and impedance matching circuitry.

According to an embodiment, the physical layer may include logical sub-blocks and physical sub-blocks that physically transmit packets to an external PCIe device. A logical sub-block may serve to perform a 'digital' function of the physical layer. More specifically, a logical sub-block may include a transmit section that prepares transmission information by a physical sub-block and a receiver section that identifies and prepares received information before passing the received information to the data link layer. The physical layer may include a transmitter Tx and a receiver Rx. The transmitter Tx may transmit a symbol serialized by the logical sub-block to an external device. According to an embodiment, the receiver Rx may receive the serialized symbol from the external device and convert the received signal into a bit stream. The bit stream may be de-serialized and supplied to the logical sub-block. In other words, the physical layer may convert the TLPs received from the data link layer into a serialized format and convert packets received from an external device into a de-serialized format. According to an embodiment, the physical layer may include logical functions related to interface initialization and maintenance.

According to an embodiment, the physical layers in the PCIe component 1 400_1 and the PCIe component 2 400 may include a configuration for operating an interface, such as a driver, an input buffer, a parallel-to-serial or serial-to-parallel converter, and a phase locked loop (PLL).

According to an embodiment, the physical layers may convert packets received from the data link layers into a serialized format to transmit the packets. In an embodiment, the physical layers may set bandwidth and frequency depending on compatibility with a device or component connected to the other side of the link. The physical layers may perform parallel-to-serial conversion and then serial-to-parallel conversion of the packets for serial data communication. In other words, the physical layers may each function as a serializer or a deserializer.

According to an embodiment, the physical layers may perform interface initialization, maintenance control, and status tracking. More specifically, the physical layers may perform interconnect power management. In an embodiment, the physical layers may negotiate bandwidth and lane mapping between components and invert lane polarity.

The physical layers may generate symbols and serial ordered sets. In an embodiment, the physical layers may transmit and align the generated symbols.

According to an embodiment, the physical layers may serve as a transmitter or a receiver of packets between PCIe components. In other words, the physical layers may convert the packets received through the transaction layers and the data link layers, and may transmit the converted packets to other PCIe components. In an embodiment, the physical layers may convert packets received from other PCIe components to transmit the converted packets to the transaction layers through the data link layers. The physical layers may generate a physical packet based on the link packet and sequentially outputting the physical packet.

According to an embodiment, each of the logical sub-blocks included in the physical layers may consist of two sections. One of the two sections may be a transmitter section that prepares for transmission of information that was transmitted from the data link layers to the physical sub-blocks. The other section may be a receiver section that identifies and prepares received information before outputting the information to the data link layers.

According to an embodiment, each of the physical sub-blocks included in the physical layers may be an electrical sub-block that supports, commonly or individually, an independent reference clock architecture. In an embodiment, the physical sub-blocks may reduce swing for a low power link operation, detect an in-band receiver, and detect an electrical idle state.

FIG. 3 exemplifies the architectures of the PCIe component 1 400_1 and the PCIe component 2 400_2. In an embodiment, the architectures of PCIe components in other embodiments may include any architecture such as a quick path interconnect architecture, a next generation high performance computing interconnect architecture, or another layered architecture.

Figure 4:
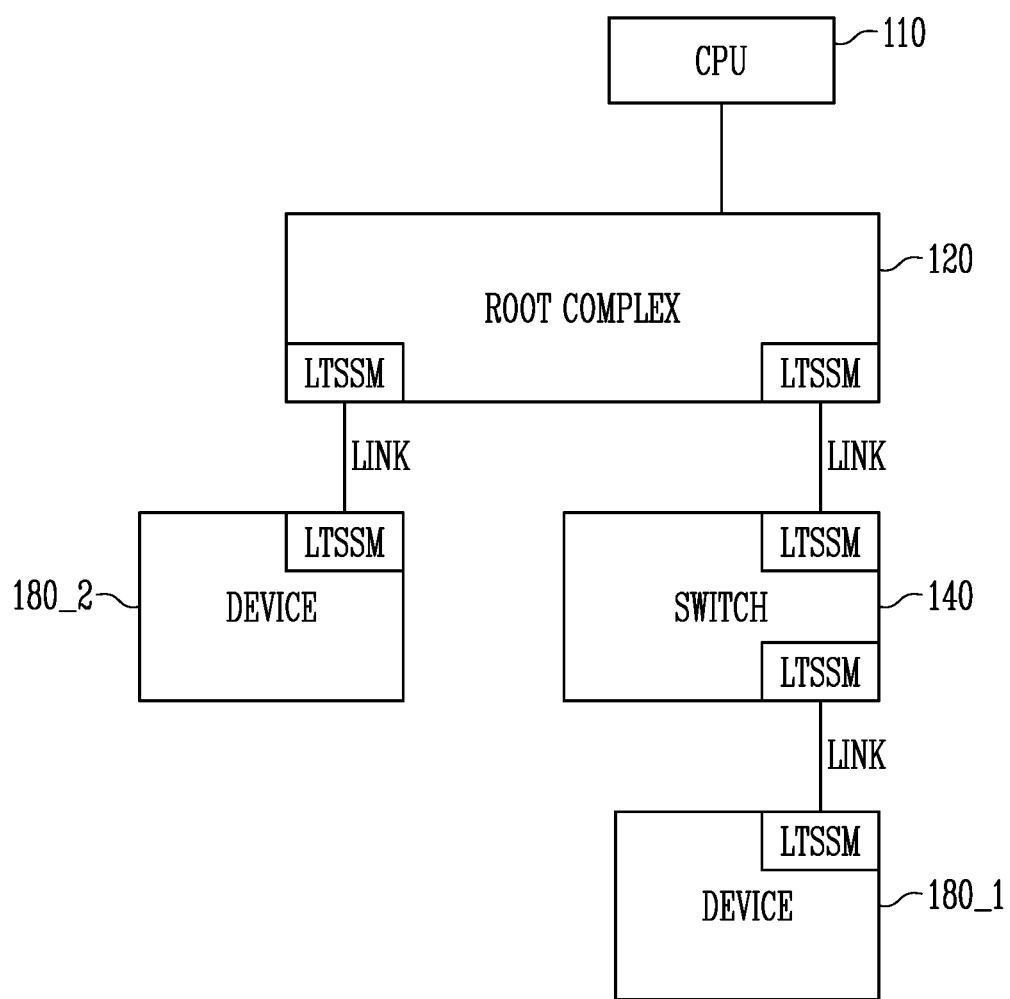
FIG. 4 is a diagram illustrating Link Training & Status State Machines (LTSSMs) according to an embodiment of the present disclosure.

FIG. 4 is a diagram illustrating Link Training & Status State Machines (also referred as a link training module) (LTSSMs) according to an embodiment of the present disclosure.

Referring to FIGS. 1 and 4, FIG. 4 shows a CPU 110, a root complex 120, a switch 140, and devices 180_1 and 180_2 (connected to endpoints). Each of the components of FIG. 4 may include a Link Training & Status State Machine (LTSSM) module. An LTSSM may exchange training sequences (e.g., TS1 and TS2) for negotiation of a plurality of link parameters such as polarity of a lane configuring a link that connects respective components, the number of links or lanes, equalization, and data transmission speed. An LTSSM may perform negotiation for a link coupled through the physical layer and maintain a data information on whether a link down, occurring when the negotiation for the link is not performed, is requested by a host. In an embodiment, performing the negotiation of the plurality of link parameters may be referred to as link training.

According to an embodiment, in a PCIe environment, an LTSSM may be a hardware-based processor that is controlled by a physical layer (213 or 223 of FIG. 3) and that enables packet transmission by configuring and initializing a link and a port between the components for a normal operation. A link may have one of the eleven states, including detect and polling states, and each state may have a sub-state.

Flow between various states that a link may have will be described below in more detail with reference to FIG. 5.

According to an embodiment, in order to configure a port for connecting components, each individual link may require a separate LTSSM. For example, in order to configure a port for connecting the root complex 120 and the device 180_2, each of the root complex 120 and the device 180_2 may include an LTSSM. In an embodiment, in order to configure a port for connecting the root complex 120 and the switch 140, each of the root complex 120 and the switch 140 may include an LTSSM. Further, in order to configure a port for connecting the switch 140 and the device 180_1, each of the switch 140 and the device 180_1 may include an LTSSM.

According to an embodiment, a port closer to the root complex 120, from among the ports of the switch 140, may be an upstream port, and a port farther away from the root complex 120 may be a downstream port. The upstream port and the downstream port may exchange training sequences (e.g., TS1 and TS2) with the root complex 120 and the device 180_1, respectively, for synchronization of LTSSM transitions. For synchronization of the LTSSM transitions, the upstream port and the downstream port may be independent from each other and may not influence each other.

According to an embodiment, the CPU 110 may not be influenced by the LTSSM of each component. Therefore, when a link down that is unintended by the host occurs, a blue screen error may result.

Figure 5:
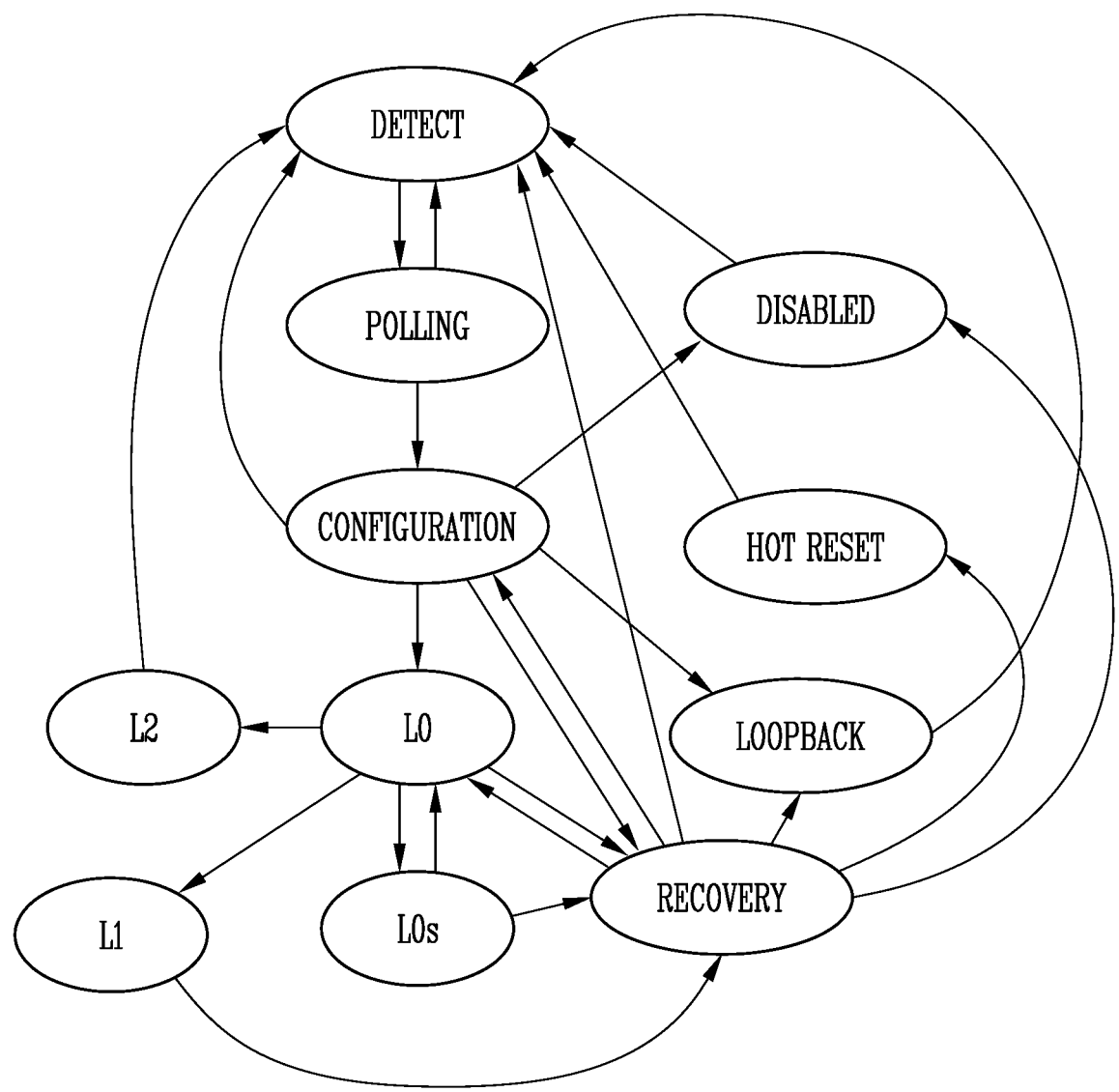
FIG. 5 is a diagram illustrating states of an LTSSM according to an embodiment of the present disclosure.

FIG. 5 is a diagram illustrating states of an LTSSM according to an embodiment of the present disclosure.

Referring to FIGS. 4 and 5, the states in FIG. 5 illustrate each state in the synchronization of LTSSM transitions.

According to an embodiment, a DETECT state may refer to a state at which a link connected to both ends of the PCIe components 1 and 2 of FIG. 2 is detected. In other words, a search for a physically coupled lane may take place in the DETECT state.

The DETECT state may be an initial state of an LTSSM and entered after reset or at the time of booting. In an embodiment, at the DETECT state, all logics, ports and registers may be reset. The DETECT state may be entered when directed. The LTSSM may enter a POLLING state from the DETECT state.

According to an embodiment, in the POLLING state, a lane that enables data communication may be distinguished from among the detected lanes. In other words, in the POLLING state, clocks at both ends of the PCIe components 1 and 2 may be synchronized, and the lane may be checked for polarity (D+ or D−) and available data transmission speed. Further, in the POLLING state, a boundary between continuous bits in data may be checked. According to an embodiment, the LTSSM may proceed to a CONFIGURATION state from the POLLING state.

According to an embodiment, in the CONFIGURATION state, a connection state of the lane may be checked. For example, in the CONFIGURATION state, a lane width that enables data communication may be determined. In an embodiment, in the CONFIGURATION state, a bit that is marked as PAD of training sequences may be changed into a negotiated number, and negotiation for best performance of both devices may be carried out. In the CONFIGURATION state, the transmitter and the receiver may transmit and receive data at negotiated data transmission and reception rates. In an embodiment, in the CONFIGURATION state, lane to lane de-skew, in which parallel bit streams of various lanes arrive at difference devices at different times, may be solved.

According to an embodiment, in the CONFIGURATION state, the LTSSM may proceed to the DETECT state, an L0 state, a RECOVERY state, a LOOPBACK state, or a DISABLED state.

According to an embodiment, in the L0 state, data and control packets may be normally transmitted and received. In other words, transaction layer packets (TLPs) and data link layer packets (DLLPs) may be transmitted and received. In an embodiment, all power management states may start from the L0 state. The L0 state may be a normal operational state. The L0 state may be a fully active state.

According to an embodiment, the LTSSM may proceed to an L1 state, an L2 state, an L0s state, or the RECOVERY state from the L0 state.

According to an embodiment, each of the L0s state, the L1 state, and the L2 state may be intended or used as a power savings state.

More specifically, the L0s state may be a sub-state of the L0 state. The L0s state may allow the link to quickly enter into and recover from a power conservation state without going through the RECOVERY state. In an embodiment, the transition from the L0s state to the L0 state may re-establish bit lock, symbol lock and Lane to Lane De-skew. The transmitter and the receiver of the ports at both ends may not necessarily be in the L0s step Simultaneously to return to the L0 state. The LTSSM may transition to the L0 state or the RECOVERY state from the L0s state.

More specifically, although the L1 state returns to the L0 state more slowly than to the L0s state, the L1 state may allow additional power savings over the L0s state at the cost of additional resume latency. The L1 state may be entered by active state power management (ASPM) or Power Management Software. The ASPM may refer to a policy that changes the link to a power savings state when a device connected via PCIe is not used. The power management software may refer to a policy that changes the device connected via PCIe to the power savings state.

In an embodiment, the entry to the L1 state may occur after being directed by the data link layer (212 or 222 in FIG. 3) and receiving an electrical idle ordered set (EIOS). The LTSSM may proceed to the RECOVERY state from the L1 state.

More specifically, power may be aggressively conserved in the L2 state, and the transmitter and the receiver of the PCIe-connected device may be shut off. In the L2 state, power and clocks may not be guaranteed, but AUX power may be available. The entry into the L2 state may occur after being directed by the data link layer (212 or 222 in FIG. 3) and receiving an electrical idle ordered set (EIOS). The LTSSM may proceed to the DETECT state from the L2 state.

According to an embodiment, the RECOVERY state may be entered when an error occurs in the L0 state, and may transition again to the L0 state after error recovery. In an embodiment, the RECOVERY state may be entered when returning to the L0 state from the L1 state, and the process flow may transition to the RECOVERY state when a LOOPBACK state, a HOT RESET state, or a DISABLED state is entered.

In the RECOVERY state, bit lock, symbol lock or block alignment, and lane-to-lane de-skew may be re-established. In an embodiment, in the RECOVERY state, a speed of a lane may be changed.

According to an embodiment, the LTSSM may enter the L0 state, the CONFIGURATION state, the DETECT state, the LOOPBACK state, the HOT RESET state, or the DISABLED state from the RECOVERY state.

According to an embodiment, the LOOPBACK state may be intended for test and entered when a bit error rate is measured. The LOOPBACK state may reset the link and use bit 2 in the training control field of the training sequences (e.g. TS1 and TS2), and the receiver may re-transmit all received packets. The LTSSM may measure the bit error rate in the LOOPBACK state and proceed to the DETECT state.

According to an embodiment, the HOT RESET state may reset the link and use bit 0 in the training sequences (e.g., TS1 and TS2). The LTSSM may proceed to the DETECT state from the HOT RESET state.

According to an embodiment, the DISABLED state may cause the transmitter to be in an electrical idle state when the receiver is in a low impedance state. In the DISABLED state, the link may be disabled until the electrical idle state is terminated. The DISABLED state may use bit 1 in the training control field of the training sequences (e.g. TS1 and TS2). The LTSSM may enter the DISABLED state when being directed by an upper state. The LTSSM may enter the DETECT state from the DISABLED state.

In FIG. 5, a link up may indicate a transition from the DETECT state, via the POLLING state and the CONFIGURATION state, to the L0 state, and a link down may indicate transition again to the DETECT state.

In an embodiment, the LTSSM may set a link up register value at each state. For example, when a link up register has a value of '1', the link up register may be in a link up state, and when the link up register has a value of '0', the link up register may have a link down state. When the LTSSM enters the L0 state for the first time, the link up register may be set to '1'.

More specifically, the link up register corresponding to the DETECT state, the POLLING state, the CONFIGURATION state, the LOOPBACK state, the HOT RESET state, and the DISABLED state may be set to '0'. The link up register corresponding to the L0 state, the L0s state, the L1 state and the L2 state may be set to '1'.

According to an embodiment, during a link down, data may be flushed, and the PCIe register and the NVMe register may be reset. Therefore, the host may initialize the PCIe register and the NVMe register. When a link down is intended by the host, the host may initialize PCIe and NVMe. The PCIe register may store information about the transaction layer, the data link layer, the physical layer, and the link training module, and include the data information included in an NVMe module coupled to an endpoint.

However, when a sudden link down is not intended by the host, for example, failures may occur, such as for example, failures to change a data transmission and reception rate, failures to change a lane, and failures to terminate power savings. In an embodiment, an LTSSM timeout may occur, and the LTSSM may transition to the DETECT state. An unintended sudden link down may be a link down between two ports. Thus, an OS and an NVMe driver may not perceive the sudden link down. Therefore, the host may try to access a device without initializing PCIe and NVMe, and a blue screen or interruption of a host operation may occur due to the reset values.

According to an embodiment, a link status of a PCIe device may include DETECT, POLLING, CONFIGURATION, HOT RESET, DISABLED, and L0 states.

The DETECT state may refer to an initial state after power on or reset. The DETECT state may be entered from the states to be described below. For example, the DETECT state may be entered from the CONFIGURATION state, the HOT RESET state, the DISABLED state, the POLLING state, an L2 state, a loopback state, and a recovery state. In the DETECT state, all logics, ports and registers may be reset, and a link coupled to the PCIe interface may be detected. In other words, a PCIe device in the DETECT state may search for a physically coupled lane.

In the POLLING state, a lane that enables data communication may be distinguished from the detected lanes. In the POLLING state, clocks at both ends of the PCIe interface may be synchronized and it may be confirmed whether the lane has a polarity of D+ or D−, for example. In addition, a data transmission speed available for the lane may be checked. In other words, in the POLLING state, polarity inversion may be checked. In addition, a link in the POLLING state may enter the DETECT state or the CONFIGURATION state.

In the CONFIGURATION state, a connection state of the lane may be checked. More specifically, in the CONFIGURATION state, a lane width that enables data communication may be determined. In addition, in the CONFIGURATION state, a lane reversal may be checked. The CONFIGURATION state may be entered from the POLLING state. Alternatively, however, after entering the L0 state, the CONFIGURATION state may be entered in the event of a lane reduction or a lane width increase.

The recovery state may be used to reconfigure a link bandwidth. In the recovery state, a link bandwidth of a set link may be changed, and bit lock, symbol lock and lane-to-lane de-skew may be reset. The recovery state may be entered when an error occurs in the L0 state. Thereafter, after the error is recovered in the recovery state, the state may be changed into the L0 state. In addition, according to an embodiment, in the recovery state, an equalization operation of the link may be performed.

The L0 state may be a normal operational state in which data and packets are transmitted and received through the link. More specifically, the L0 state may be an operational state of a physical bus interface where data and control packets may be transmitted and received. The L0 state may be a fully active state.

An L0s state may refer to a state in which the physical bus interface may enter quickly into a power conservation state and recover therefrom without going through the recovery state. The L0s state may be a power saving state. The L0s state may refer to an idle or standby state of some functions in the interface.

The L1 state may be a power saving state. The L1 state may refer to a power saving state that allows additional power savings over the L0s state. The L1 state may be a low power standby state.

The L2 state may be a power saving state that aggressively conserves power. Most of the transmitters and receivers may be shut off. Although a main power supply and clocks are not guaranteed, an auxiliary power supply may be provided. The L2 state may be a low power sleep state in which power is not supplied to most of the functions.

The loopback state may be intended for test and fault isolation use. The loopback state may operate on a per lane basis and a loopback receive lane must be selected and configured.

The DISABLED state may allow a set link to be DISABLED until directed. The HOT RESET state may only be triggered by the downstream port. The downstream port may use training sequences (e.g., TS1 or TS2) to propagate HOT RESET. The training sequences TS may be composed of ordered sets used for initializing bit alignment, symbol alignment and to exchange physical layer parameters.

Figure 6:
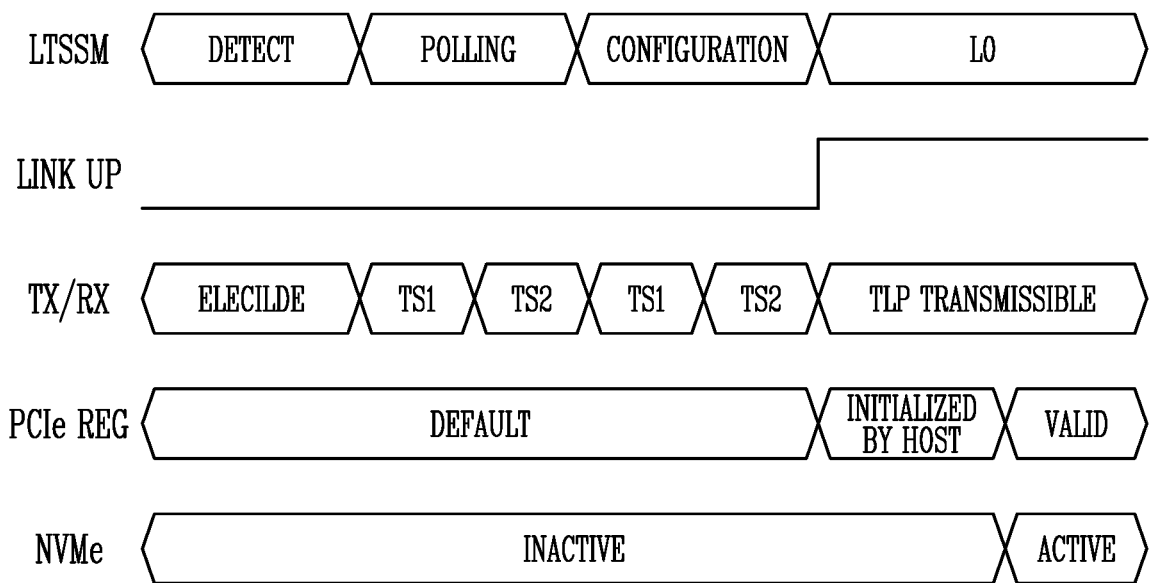
FIG. 6 is a diagram illustrating a link up process according to an embodiment of the present disclosure.

FIG. 6 is a diagram illustrating a link up process according to an embodiment of the present disclosure.

Referring to FIGS. 5 and 6, FIG. 6 illustrates a link up process through the states illustrated by FIG. 5, in addition to states of a PCIe register (PCIe REG) and NVMe.

According to an embodiment, an LTSSM may transition from a DETECT state through a POLLING state and a CONFIGURATION state, to an L0 state, which is referred to as a link up. In the L0 state, the LTSSM may normally transmit and receive transaction layer packets (TLPs) and data link layer packets (DLLPs).

According to an embodiment, the receiver RX and the transmitter TX at both ports connected through the link may be in an electrically idle state (ELECIDLE). In an embodiment, the receiver RX and the transmitter TX at both ports may synchronize the LTSSM transitions by transmitting and receiving training sequences (e.g., TS1 and TS2) in the POLLING state and the CONFIGURATION state. In the L0 state, the receiver RX and the transmitter TX at both ports may be in a state (TLP TRANSMISSIBLE), in which the receiver RX and the transmitter TX transmit and receive transaction layer packets (TLPs).

According to an embodiment, the PCIe register (PCIe REG) may be in a default state (DEFAULT) during the DETECT state, the POLLING state and the CONFIGURATION state. The PCIe register (PCIe REG) may be initialized by the host in the L0 state and may then be in a valid state.

According to an embodiment, the NVMe register may remain inactive state (INACTIVE) until the PCIe register (PCIe REG) is initialized, and may be active state (ACTIVE) after the PCIe register (PCIe REG) is initialized.

Figure 7:
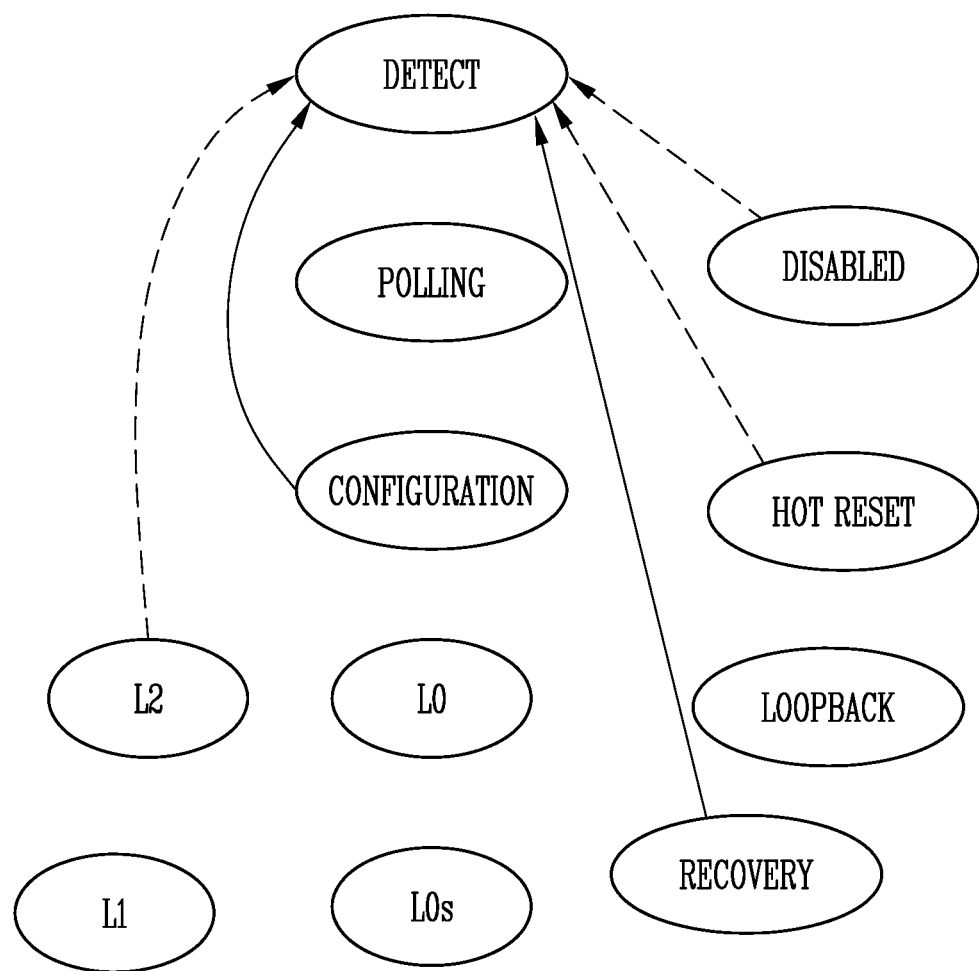
FIG. 7 is a diagram illustrating a link down that is intended by a host and a link down that is not intended by the host according to an embodiment of the present disclosure.

FIG. 7 is a diagram illustrating a link down that is intended by a host and a link down that is not intended by the host according to an embodiment of the present disclosure.

Referring to FIGS. 5 and 7, FIG. 7 illustrates an intentional link down by the host and an unintentional link down by the host. In FIG. 7, a transition indicated by dashed lines may correspond to an intentional link down by the host, and a transition indicated by solid lines may correspond to an unintentional link down by the host.

According to an embodiment, an intentional link down by the host and an unintentional link down by the host may be distinguished from each other based on the state prior to transitioning to the DETECT state.

For example, when a state before transitioning to the DETECT state is the L2 state, the HOT RESET state, or the DISABLED state, a link down may correspond to an intentional link down by the host. In an embodiment, in another example, when a cold reset or a warm reset is performed, a link down may be an intentional link down by the host. A cold reset may refer to a start of link training when power is re-applied after a power on reset (POR), and a warm reset may refer to a reset that occurs while power is maintained.

However, when the state right before transitioning to the DETECT state is the CONFIGURATION state or the RECOVERY state, a link down may correspond to an unintentional link down by the host. The unintentional link down by the host may proceed from the DETECT state to the L0 state when a timeout occurs in the CONFIGURATION state or the RECOVERY state, which may take place after an L0 state.

Thus, a method is disclosed for distinguishing between a link down intended by the host from a link down not intended by the host, including maintaining a PCIe register and an NVMe register in the case of a sudden link down that is not intended by the host.

More specifically, to differentiate an intentional link down by the host from a sudden link down that is not intended by the host, when the link up register changes from '1' to '0', the LTSSM may separately store information about the current state right before the state change.

According to an embodiment, when the state that is changed is the LOOPBACK state, the HOT RESET state, or the DISABLED state, the link down may be an intentional link down by the host regardless of the immediately prior state.

According to an embodiment, when the state that is changed is the DETECT state, the LTSSM may check the state immediately prior to the DETECT state. For example, when a state right before changing to the DETECT state is the L2 state, the HOT RESET state, or the DISABLED state, the link down may correspond to an intentional link down by the host. However, when the state right before changing to the DETECT state is the CONFIGURATION state or the RECOVERY state, the link down may correspond to a sudden link down that is not intended by the host.

Figure 8:
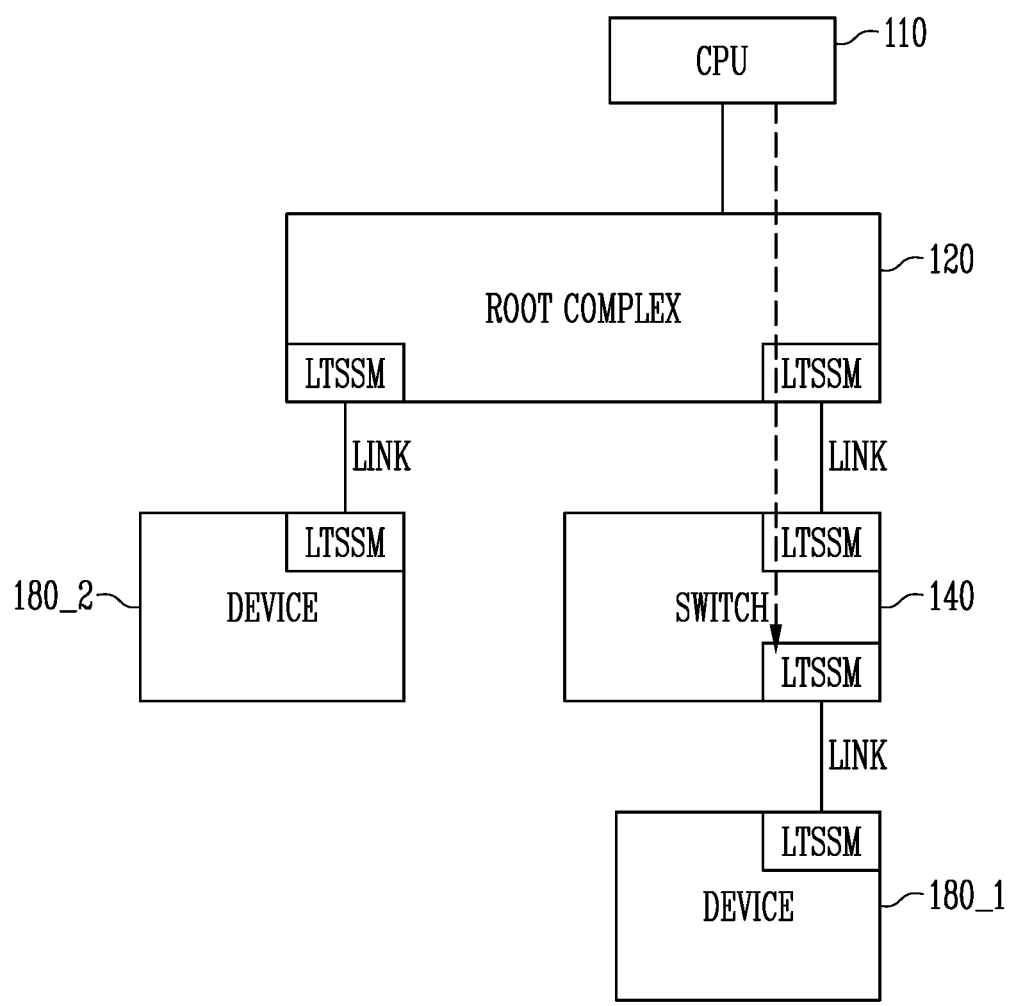
FIG. 8 is a diagram illustrating Link Training & Status State Machines (LTSSMs) relating to an intentional link down by a host according to an embodiment of the present disclosure.

FIG. 8 is a diagram illustrating Link Training & Status State Machines (LTSSMs) relating to an intentional link down by a host according to an embodiment of the present disclosure.

Referring to FIGS. 4 and 8, FIG. 8 illustrates that a CPU 110 of FIG. 4 that performs a HOT RESET through the PCIe register of the downstream port of a switch 140. The downstream port may be farther away from the root complex 120 compared with other ports of the switch 140. The downstream port may synchronize LTSSM transitions by exchanging training sequences (e.g., TS1 and TS2) with a device 180_1. The HOT RESET state may refer to a state in which a link is reset.

According to an embodiment, the HOT RESET state may be carried out by the PCIe register of the downstream port. After the HOT RESET state, a link up may be performed. In other words, an LTSSM may proceed to the DETECT state from the HOT RESET state.

Therefore, since the state before transitioning to the DETECT state is the HOT RESET process, the link down may be a link down that is intended by the host.

Figure 9:
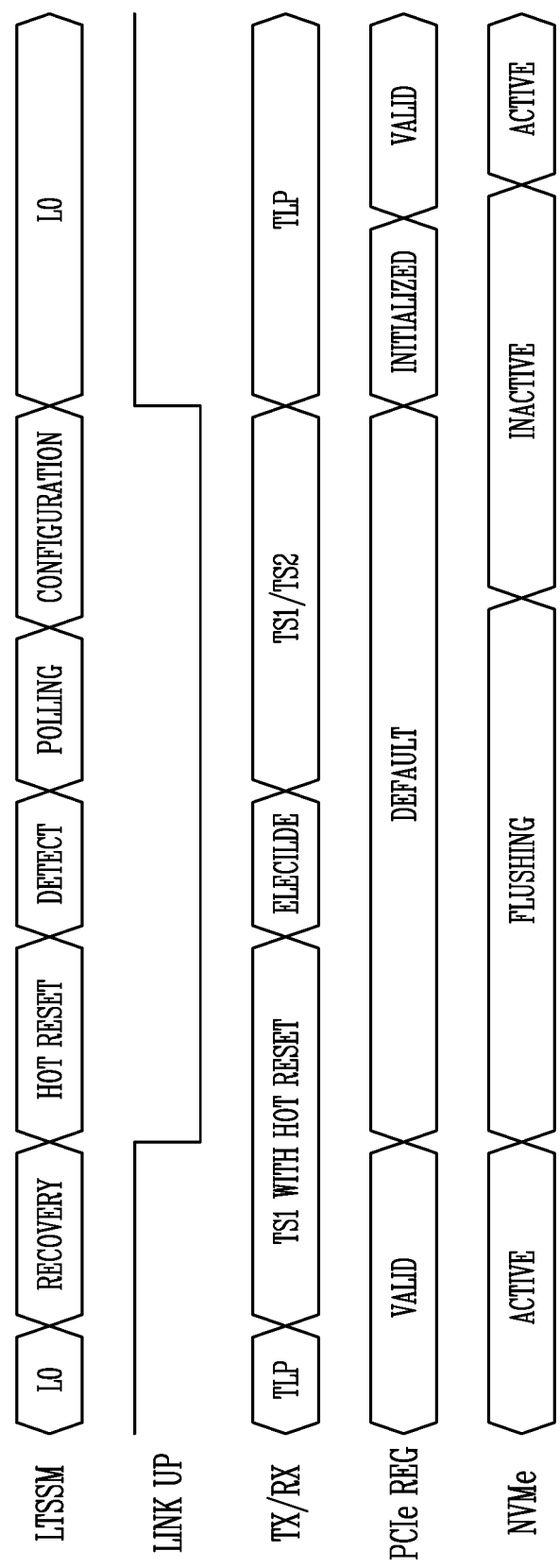
FIG. 9 is a diagram illustrating an operation of a PCIe interface device when a link down is intended by a host according to an embodiment of the present disclosure.

FIG. 9 is a diagram illustrating an operation of a PCIe interface device when a link down is intended by a host according to an embodiment of the present disclosure.

Referring to FIGS. 7 and 9, FIG. 9 illustrates states of a PCIe register (PCIe REG) and an NVMe in a process of re-establishing a link up when, from among the examples of a link down intended by the host of FIG. 7, a link down transitions from a RECOVERY state to a HOT RESET state.

According to an embodiment, an LTSSM may change from an L0 state, through a RECOVERY state, to a HOT RESET state. Since a state right before transitioning to a DETECT state is the HOT RESET state, the link down may be intended by the host. The LTSSM may reset the link in the HOT RESET state and transition again to the DETECT state. Subsequently, the LTSSM may enter the L0 state after a POLLING state and a CONFIGURATION state, and may re-establish a link up.

According to an embodiment, in the L0 state, the transmitter TX and the receiver RX of both ports may transmit or receive transaction layer packets (TLPs). However, in the RECOVERY state and the HOT RESET state, the transmitter TX and the receiver RX of both ports may transmit and receive TS1 (TS1 WITH HOT RESET), and in the DETECT state, the transmitter TX and the receiver RX may be in an electrically idle state (ELECIDLE).

Subsequently, in the POLLING state and the CONFIGURATION state, the transmitter TX and the receiver RX of both ports may transmit and receive TS1 and TS2 to differentiate a lane enabling data communication and to check the connection state of the lane. According to an embodiment, when the LTSSM enters the L0 state, the transmitter TX and the receiver RX of both ports may transmit or receive the transaction layer packets (TLPs).

According to an embodiment, the PCIe register (PCIe REG) may be valid (VALID) in the L0 state and the RECOVERY state, but may change to a default state (DEFAULT) when the LTSSM enters the HOT RESET state from the RECOVERY state. Subsequently, when the LTSSM enters the L0 state, the PCIe register (PCIe REG) may be initialized (INITIALIZED) and change to a valid state (VALID). In other words, when an intentional link down by the host occurs, the PCIe register (PCIe REG) may be initialized.

According to an embodiment, when the NVMe has an active state (ACTIVE) during the LTSSM transition from the L0 state to the RECOVERY state, or during a transition from the RECOVERY state to the HOT RESET state, the NVMe may flush an ongoing command. Subsequently, when the NVMe changes to an inactive state (INACTIVE) in the CONFIGURATION state, and the PCIe register (PCIe REG) is initialized (INITIALIZED), the NVMe may return to the active state (ACTIVE). In other words, when an intentional link down by the host occurs, the NVMe may perform a flush before activation.

For example, after flushing of the command is completed, the NVMe may change to an inactive state (INACTIVE) and pass through the CONFIGURATION state, and the link up may be completed in the L0 state. Then, when the PCIe register (PCIe REG) is initialized (INITIALIZED), the NVMe may be changed back to the active state (ACTIVE) by the host.

When the host sends a config request to the NVMe, if the NVMe is flushing a command, then the NVMe may ignore the config request by returning a configuration request retry status (CRS). When the host sends the config request to the NVMe, if the NVMe has finished flushing the command, then the NVMe may send a success return (SR) and be initialized.

As a result, the OS and the driver may perceive a link down intended by the host, so the PCIe register (PCIe REG) and the NVMe may be initialized and activated.

Figure 10:
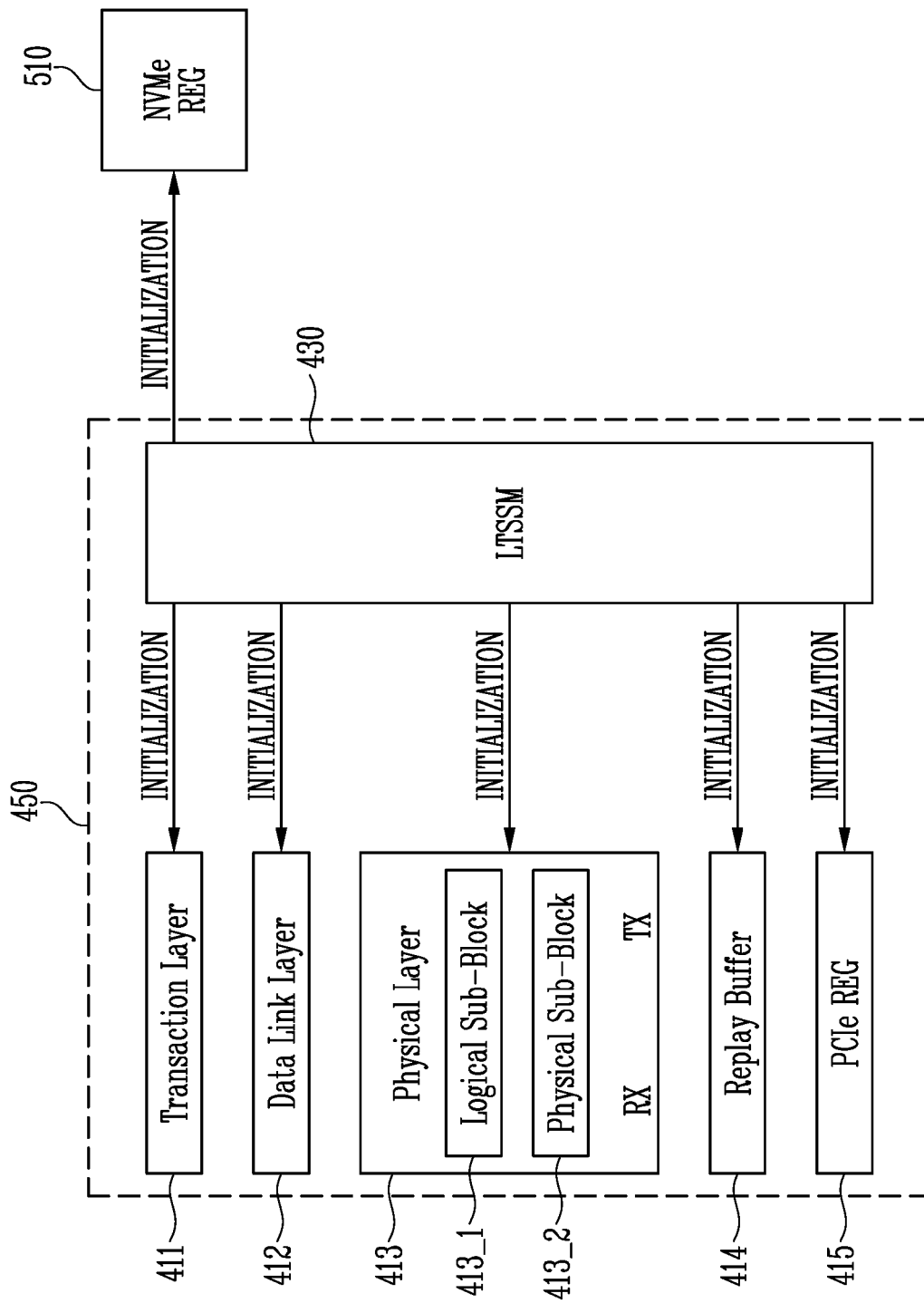
FIG. 10 is diagram illustrating an operation of a PCIe interface device of FIG. 9 according to an embodiment of the present disclosure.

FIG. 10 is diagram illustrating an operation of a PCIe interface device of FIG. 9 according to an embodiment of the present disclosure.

Referring to FIG. 10, a PCIe interface device 450 includes a transaction layer 411, a data link layer 412, a physical layer 413, a replay buffer 414, a PCIe register 415, and LTSSM 430. A non-volatile memory express register (NVMe REG) 510 may be included in an NVMe module. Referring to FIGS. 9 and 10, FIG. 10 illustrates operations of an LTSSM 430 for a link down that is intended by the host of FIG. 9. The replay buffer 414 of FIG. 10 may be a retry buffer that stores transaction layer packets (TLPs) for re-transmission. The NVMe register (NVMe REG) 510 may be included in an NVMe module.

According to an embodiment, when an intentional link down by the host occurs, the LTSSM 430 may initialize the transaction layer 411, the data link layer 412, the physical layer 413, the PCIe register 415, and the NVMe register 510 (INITIALIZATION).

The LTSSM 430 may initialize the NVMe register 510 by performing an NVMe reset through a link down interrupt. If the NVMe is executing a command, then the NVMe may flush the command being executed. When flushing of the command is completed, the NVMe may perform initialization again through a PCIe inbound path.

According to an embodiment, when an intentional link down by the host occurs, the LTSSM 430 may return an error with respect to every transaction to the transaction layer 411, and may perform initialization after the error return is completed.

Figure 11:
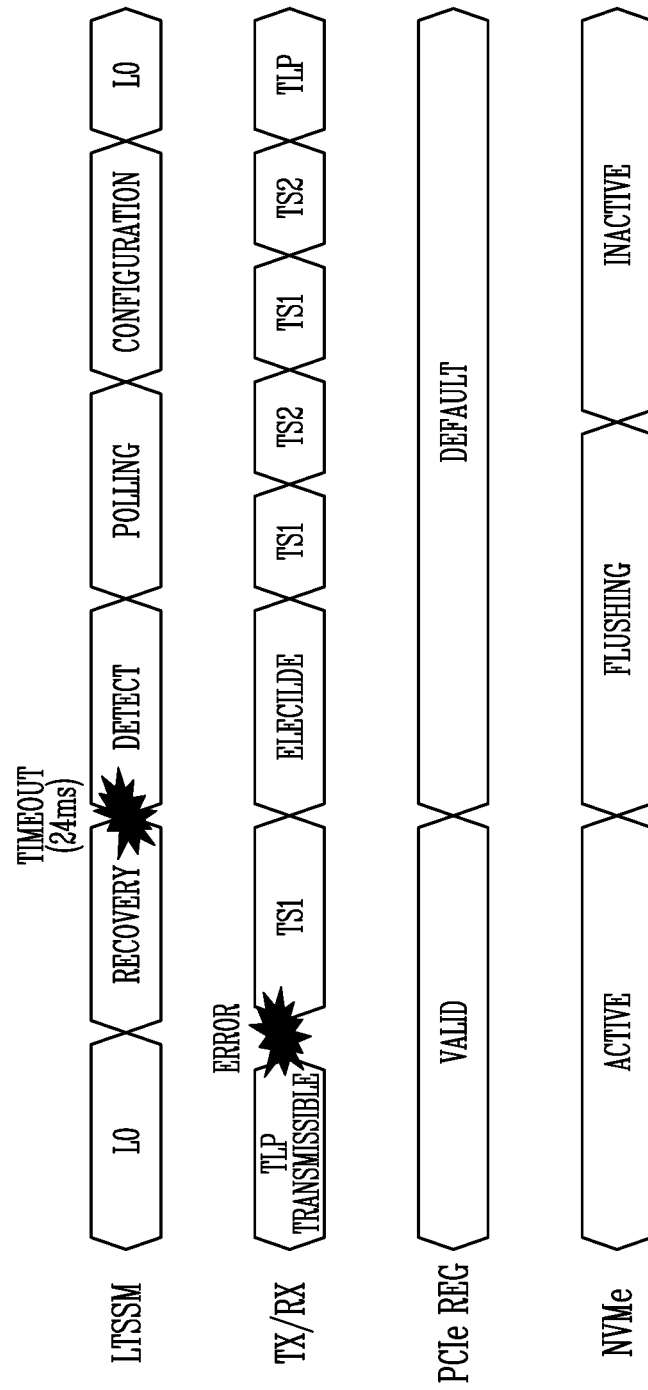
FIG. 11 is a diagram illustrating an operation of a PCIe interface device when a link down is not intended by a host according to an embodiment of the present disclosure.

FIG. 11 is a diagram illustrating an operation of a PCIe interface device when a link down is not intended by a host according to an embodiment of the present disclosure.

Referring to FIGS. 7 and 11, FIG. 11 illustrates states of a PCIe register (PCIe REG) and an NVMe in a process of re-establishing a link up when, from among the examples of a link down that is not intended by the host of FIG. 7, a link down transitions from a RECOVERY state directly to a DETECT state.

According to an embodiment, an LTSSM may change from the RECOVERY state to the DETECT state. For example, the LTSSM may change from the RECOVERY state to the DETECT state when a timeout, such as for example twenty-four milliseconds (24 ms), occurs due to an error in the RECOVERY state.

Since a state right before transitioning to the DETECT state is the RECOVERY state, a link down may correspond to a sudden link down that is not be intended by the host. Subsequently, the LTSSM may enter the L0 state through a POLLING state and a CONFIGURATION state, and may establish a link up again.

According to an embodiment, in the L0 state, the transmitter TX and the receiver RX of both ports may transmit or receive transaction layer packets (TLP TRANSMISSIBLE). However, due to errors (ERROR), the transmitter TX and the receiver RX of both ports may transmit or receive TS1 in the RECOVERY state and may be in an electrically idle state (ELECIDLE) in the DETECT state.

Subsequently, in the POLLING state and the CONFIGURATION state, the transmitter TX and the receiver RX of both ports may transmit and receive TS1 and TS2 to differentiate a lane, from among the detected lanes, enabling data communication and may check the connection state of the lane. When the LTSSM enters the L0 state again, the transmitter TX and the receiver RX of both ports may transmit or receive the transaction layer packets (TLPs).

According to an embodiment, the PCIe register (PCIe REG) may be valid (VALID) in the L0 state and the RECOVERY state, and may change to a default state (DEFAULT) from the valid state (VALID) due to the LTSSM TIMEOUT. In other words, when unintentional link down by the host occurs, the PCIe register (PCIe REG) may be changed to the default state (DEFAULT), which is maintained.

According to an embodiment, the NVMe, which is in an active state (ACTIVE) in the L0 state and the RECOVERY state, may flush a command being executed. Subsequently, in the CONFIGURATION state, the NVMe may be changed into an inactive state (INACTIVE), which is maintained.

When an unintentional link down by the host occurs, the PCIe register (PCIe REG) may be initialized and the NVMe may be reset. As the PCIe register (PCIe REG) is initialized, information about base address registers (BARs) may be initialized.

Therefore, it may be impossible to check a TLP address, and it may be impossible to access the NVMe register with the TLP. Thus, an operation corresponding to an NVMe command may be impossible. As a result, a blue screen of death (BSOD) may occur.

However, according to the present disclosure, when an unintentional link down by the host occurs, the PCIe register (PCIe REG) and the NVMe register may be maintained without being initialized, thereby preventing the generation of the BSOD.

Figure 12:
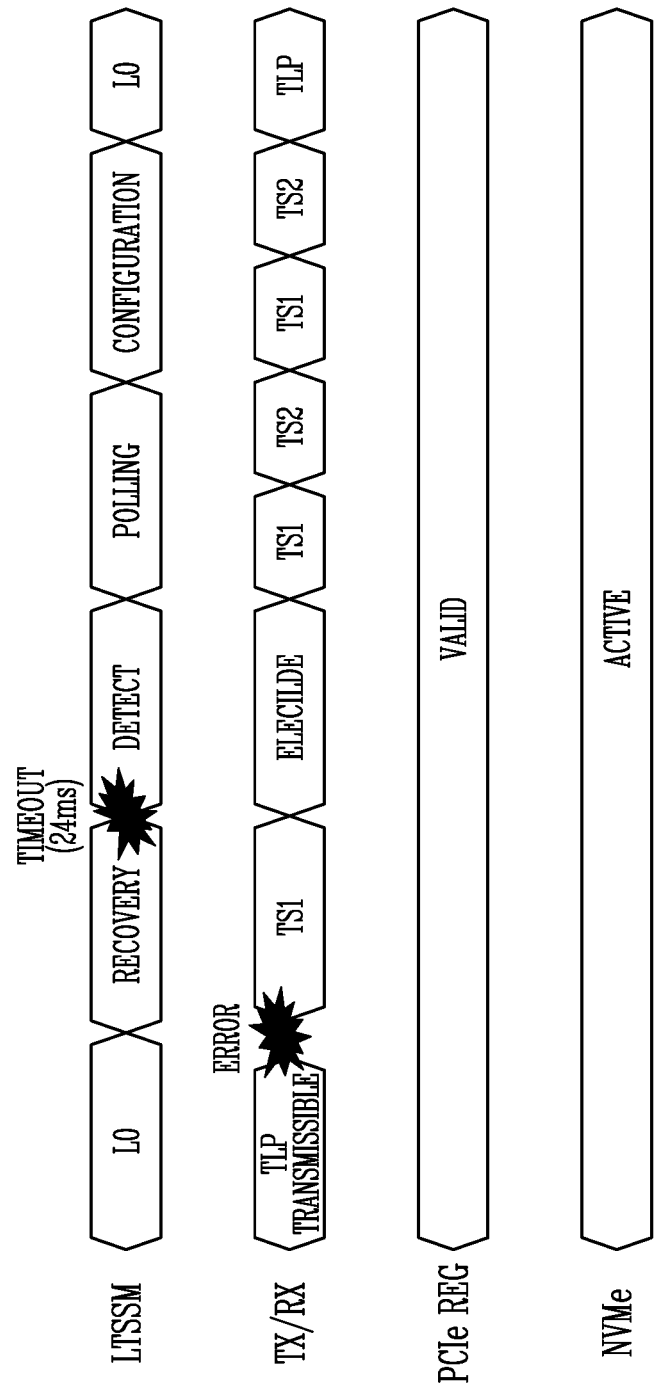
FIG. 12 is a diagram illustrating an operation of a PCIe interface device when a link down is not intended by a host according to an embodiment of the present disclosure.

FIG. 12 is a diagram illustrating an operation of a PCIe interface device when a link down is not intended by a host according to an embodiment of the present disclosure.

Referring to FIGS. 7 and 12, FIG. 12 illustrates states of a PCIe register (PCIe REG) and an NVMe in a process of re-establishing a link up when, from among the examples of a sudden link down not intended by the host of FIG. 7, a link down transitions from a RECOVERY state directly to a DETECT state.

Referring to FIGS. 11 and 12, FIG. 12 is substantially the same as FIG. 11, except for the states of a PCIe register (PCIe REG) and an NVMe. Thus, redundant descriptions will be omitted to simplify the description of FIG. 12.

According to an embodiment, unlike FIG. 11, even when an LTSSM TIMEOUT occurs, the PCIe register (PCIe REG) may maintain a valid state (VALID). In an embodiment, even when the LTSSM TIMEOUT occurs, the NVMe may maintain an active state (ACTIVE).

Since the PCIe register (PCIe REG) maintains a valid state (VALID) and the NVMe maintains an active state (ACTIVE), the NVMe may perform an operation corresponding to a new NVMe command as well as an operation corresponding to the current command being executed.

Figure 13:
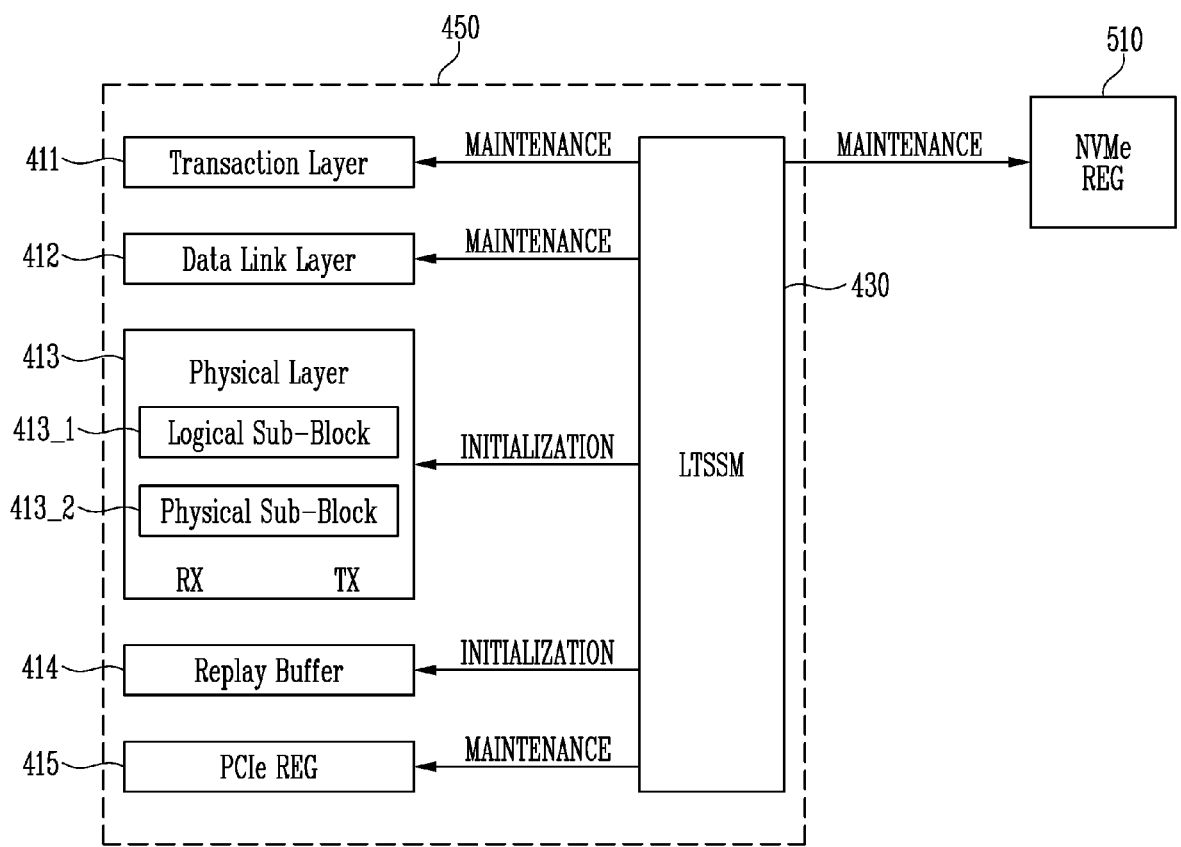
FIG. 13 is diagram illustrating an operation of a PCIe interface device of FIG. 12 according to an embodiment of the present disclosure.

FIG. 13 is diagram illustrating an operation of a PCIe interface device of FIG. 12 according to an embodiment of the present disclosure.

Referring to FIG. 13, a PCIe interface device 450 includes a transaction layer 411, a data link layer 412, a physical layer 413, a replay buffer 414, a PCIe register 415, and LTSSM 430. A non-volatile memory express register (NVMe REG) 510 may be included in an NVMe module. Referring to FIGS. 12 and 13, FIG. 13 illustrates operations of an LTSSM 430 for a link down that is not intended by the host of FIG. 12. The unintentional link down by the host may be a sudden link down. The replay buffer 414 as shown in FIG. 13 may be a retry buffer that stores transaction layer packets (TLPs) for re-transmission. The NVMe register 510 may be included in an NVMe module.

According to an embodiment, when an unintentional link down by the host occurs, contrary to an intentional link down by the host, the LTSSM 430 may initialize the physical layer 413 and the replay buffer 414 (INITIALIZATION) and may maintain the transaction layer 411, the data link layer 412, the PCIe register 415, and the NVMe register 510 (MAINTENANCE). If any data is lost during the initialization of the physical layer 413 and the replay buffer 414, then the LTSSM 430 may transmit the data loss as an AXI error to the NVMe module. The LTSSM 430 may maintain the NVMe register 510 through a sudden link down interrupt and perform an operation corresponding to a command in which the AXI error occurs.

According to an embodiment, when an unintentional sudden link down occurs, which is not intended by the host, all of the PCIe control registers may be maintained, whereas only some of the PCIe Status/Capability registers may be maintained. A link speed and a negotiated link width of the PCIe Status/Capability register may be initialized. Selectively, a correctable error state of the AER by the sudden link down may be initialized.

According to an embodiment, when a sudden link down that is not intended by the host occurs, the NVMe may execute an ongoing command. When an error returns to the NVMe from the PCIe component due to a timeout (TIMEOUT), if a link up is re-established, then the NVMe may perform an operation corresponding to the command again.

In an embodiment, when the LTSSM 430 returns to the L0 state and the link up is re-established, the NVMe may resume executing the ongoing command.

As a result, when a sudden link down occurs that is not intended by the host, interruptions of the operations of the OS or the NVMe driver may be prevented by maintaining the PCIe register 415 and the NVMe register 510.

Figure 14:
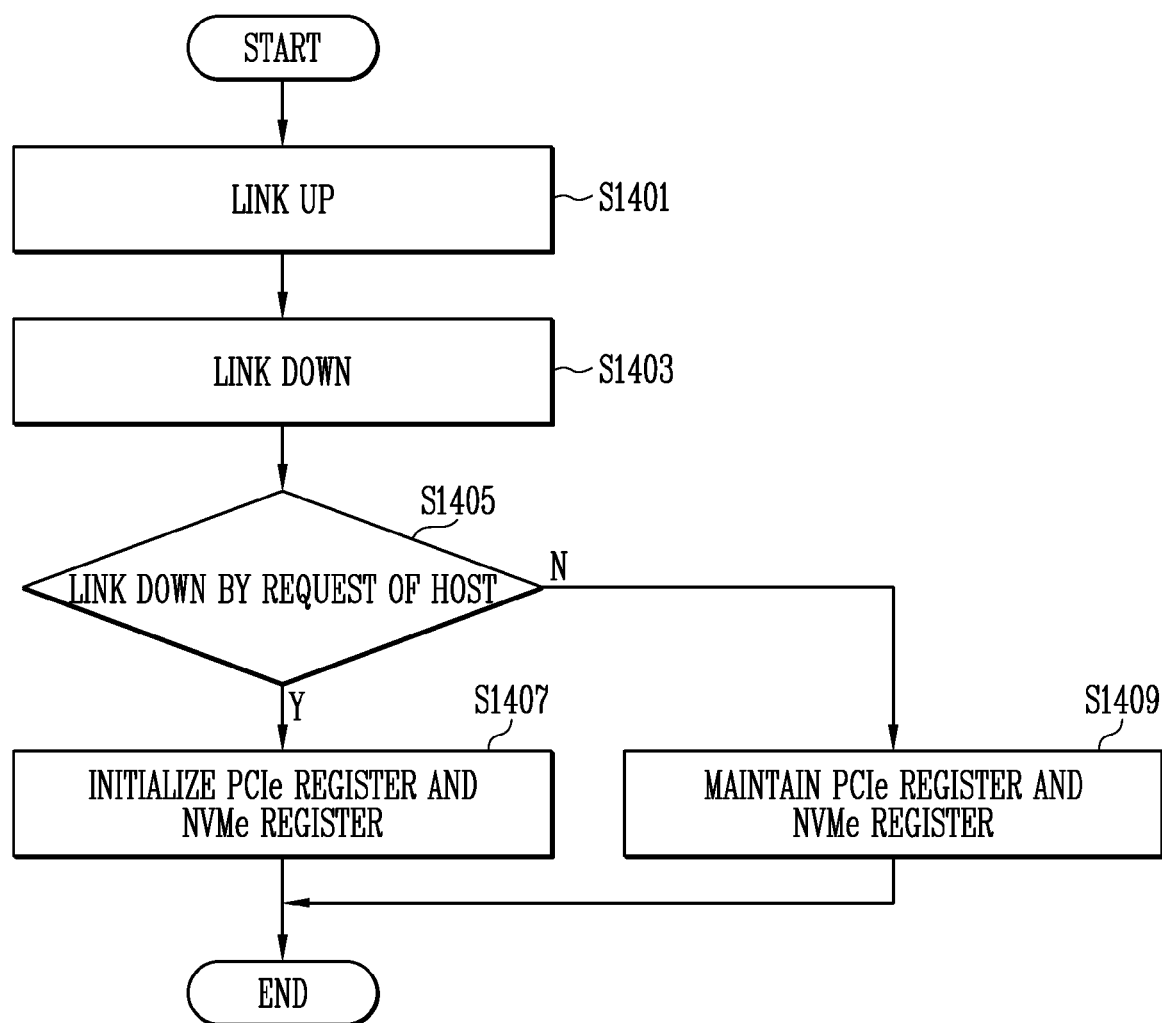
FIG. 14 is a diagram illustrating a method of operating a PCIe interface device according to an embodiment of the present disclosure.

FIG. 14 is a diagram illustrating a method of operating a PCIe interface device according to an embodiment of the present disclosure.

Referring to FIG. 14, at step S1401, an LTSSM may be in a link up state. A link up may refer to transitioning from a DETECT state through a POLLING state and a CONFIGU- RATION state to an L0 state. In an embodiment, a link up may refer to a state in which a link up register at each state is set to '1.'

At step S1403, the LTSSM may be in a link down state. A link down state may indicate that a different state transitions to the DETECT state. In an embodiment, link down may refer to a state in which the link up register at each state is set to '0.'

According to an embodiment, a link down may be a link down that is intended by the host and a sudden link down that is not intended by the host. An intentional link down by the host may mean that the LTSSM changes from the link up state to the link down state in response to a request by the host. A sudden link down, which is not intended by the host, is not be requested by the host, and may mean that the LTSSM transitions to the DETECT state due to a timeout caused by failures to change data transmission and reception rates, failures to change a lane, or failures to terminate power saving.

At step S1405, the LTSSM may determine whether the link down is requested by the host or not. When the link down is requested by the host (Y), the process may proceed to step S1407. When the link down is not requested by the host (N), i.e., when the link down is a sudden link down, the process may proceed to step S1409.

At step S1407, the LTSSM may initialize the PCIe register and the NVMe register. According to an embodiment, a link down intended by the host may result in data that is flushed by NVMe register and resetting of the PCIe register and the NVMe register. Therefore, the LTSSM may initialize the PCIe register and the NVMe register.

At step S1409, the LTSSM may maintain the PCIe register and the NVMe register. According to an embodiment, the OS and the NVMe driver may not be able to perceive a link down that is not requested by the host. Therefore, in order to prevent a blue screen or interruptions of the operations of the host due to the reset values, the LTSSM may maintain the PCIe register and the NVMe register.

According to the present disclosure, a PCIe interface device capable of completing processing of a command when a link down that is not intended by a host occurs and methods of operating the PCIe interface device are provided in U.S. patent application Ser. No. 17/527,062 filed Nov. 15, 2021 and entitled, "PERIPHERAL COMPONENT INTERCONNECT EXPRESS INTERFACE DEVICE AND OPERATING METHOD THEREOF", the entire disclosure of which is incorporated herein by reference.

Figure 15:
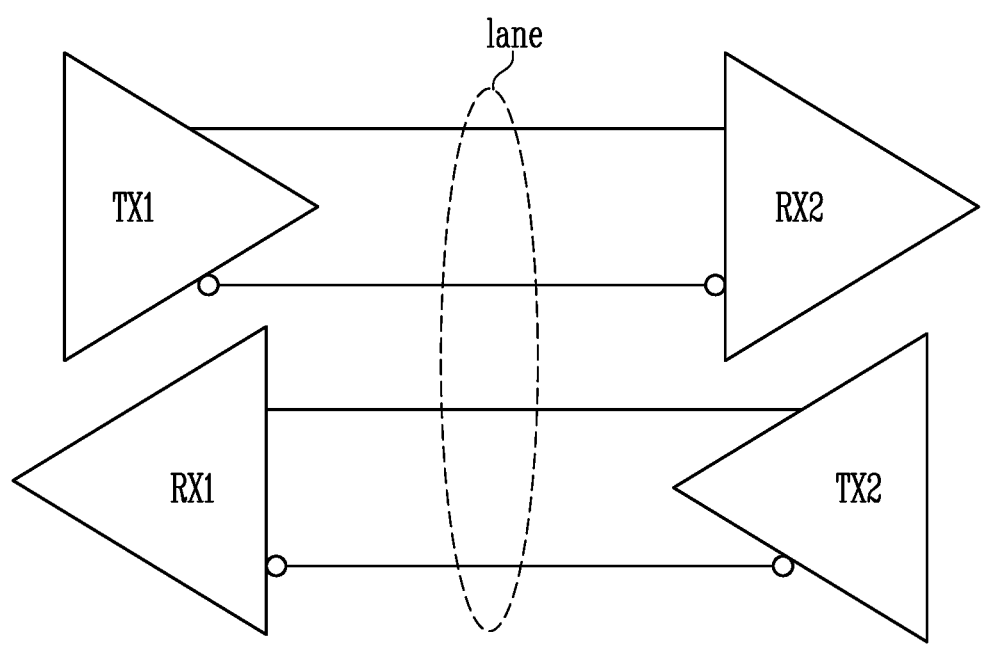
FIG. 15 is a diagram illustrating a transmitter, a receiver and a lane according to an embodiment of the present disclosure.

FIG. 15 is a diagram illustrating a transmitter, a receiver, and a lane according to an embodiment of the present disclosure.

FIG. 15 illustrates a first transmitter TX1, a second transmitter TX2, a first receiver RX1, and a second receiver RX2. A lane may include paths that include differentially driven signal pairs, e.g., a transmission path pair configured for transmission and a reception path pair configured for reception. A PCIe device may include transmission logic that transmits data to another PCIe device and reception logic that receives data from another PCIe device. The PCIe device may be referred to as a PCIe component. For example, a PCIe device may include two transmission paths coupled to the first transmitter TX1 and two reception paths coupled to the first receiver RX1.

A transmission path may refer to an arbitrary path for data transmission, such as a transmission line, a copper line, a wireless communication channel, an infrared communication link, or another communication path. In addition, a reception path may be realized in the same manner as the transmission path, and the reception path may be provided for reception.

A connection between two PCIe devices, for example the first PCIe component 400_1 and the second PCIe component 400_2 as shown in FIG. 2, may be referred to as a link. A link may support at least one lane. In addition, each lane may be indicated by a set of differential signal pairs (one pair for transmission and the other pair for reception). A differential signal pair may refer to two signals that have the same frequency and amplitude, but opposite phases. For example, when a first signal has a rising edge that toggles from 0 to a voltage level of V+, a second signal may have a falling edge that toggles from 0 to a voltage level of V−. A PCIe device may use signal integrity, for example, electrical characteristics such as cross-coupling, voltage overshoot/undershoot, and ringing, and may control the transmission frequency more quickly by using differential signals. In addition, a PCIe device may include a plurality of lanes to control bandwidth. For example, two PCIe devices may form a link that consists of 1, 2, 4, 8, 12, 16, or 64 lanes.

Figure 16:
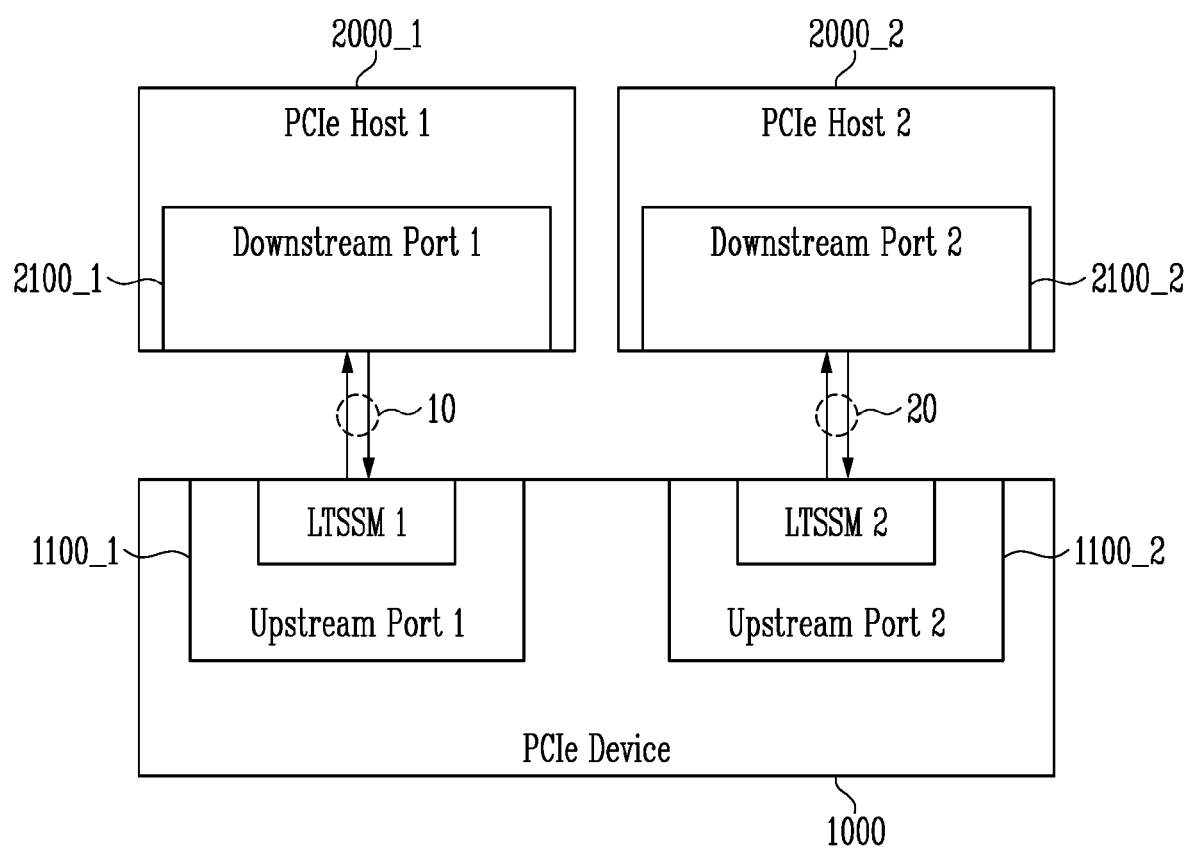
FIG. 16 is a diagram illustrating a dual port mode and a single port mode according to an embodiment of the present disclosure.

FIG. 16 is a diagram illustrating a dual port mode and a single port mode according to an embodiment of the present disclosure.

Referring to FIG. 16, a PCIe device 1000 may link up with a first PCIe host 2000_1 and a second PCIe host 2000_2. A link-up may refer to a state in which a connection is established to enable logical data communication. The first PCIe host 2000_1 and the second PCIe host 2000_2 may be in upper layers compared to the PCIe device 1000. In addition, data movement and transmission to an upper layer may be referred to as "upstream" and a port that supports upstream may be referred to as an "upstream port." On the other hand, data movement and transmission to a lower layer may be referred to as "downstream" and a port that supports downstream may be referred to as a "downstream port." For example, referring to FIG. 1, the switch 140 may support downstream and upstream routing. More specifically, upstream may refer to routing up a hierarchy towards the root complex 120 from the PCIe endpoint (e.g., 150_1), and downstream may refer to routing down a hierarchy away from the root complex 120 towards the PCIe endpoint (e.g., 150_2).

The PCIe device 1000 may include a first upstream port 1100_1 and a second upstream port 1100_2. In addition, the PCIe device 1000 may perform data communication with the first PCIe host 2000_1 and the second PCIe host 2000_2 in a dual port mode in which the first upstream port 1100_1 and the second upstream port 1100_2 operate independently of each other.

More specifically, the first upstream port 1100_1 included in the PCIe device 1000 may link up with the first PCIe host 2000_1 using a first link 10. In addition, the second upstream port 1100_2 included in the PCIe device 1000 may link up with the second PCIe host 2000_2 using a second link 20. The first upstream port 1100_1 may link up with a first downstream port 2100_1 of the first PCIe host 2000_1. The second upstream port 1100_2 may link up with a second downstream port 2100_2 of the second PCIe host 2000_2. A link width of each of the first and second links 10 and 20 may include a lane such as x1, x2, x4, x8, x12, x16, x32, and x64.

According to an embodiment, when the PCIe device 1000 operates in the dual port mode, errors, such as a clock error, which occur in the first link 10 between the first upstream port 1100_1 and the first downstream port 2100_1 may not influence the second link 20 between the second upstream port 1100_2 and the second downstream port 2100_2.

According to an embodiment, each of the first and second upstream ports 1100_1 and 1100_2 may include a PCIe interface and a Link Training & Status State Machine (LTSSM). In other words, PCIe interfaces and LTSSMs of the first and second upstream ports 1100_1 and 1100_2 may be independent of each other. More specifically, the first upstream port 1100_1 may include a first LTSSM 1 and the second upstream port 1100_2 may include a second LTSSM 2. In addition, the first LTSSM 1 and the second LTSSM 2 may independently perform link training of the first link 10 and link training of the second link 20.

FIGS. 17 to 20 are diagrams illustrating a dual port mode and a single port mode according to embodiments of the present disclosure.

In FIGS. 17 to 20, PCIe Phy is designed to maximize interface speed in the difficult system environments found in high-performance computing. The PCIe Phy may be referred as to a physical layer in a PCIe device. The PCIe Phy is a low-power, area-optimized, silicon-proven IP designed with a system-oriented approach to maximize flexibility and ease integration for customers. Multiplexer (Mux) is a combinational logic circuit designed to switch one of several input lines through to a single common output line by the application of a control signal. The Mux operates like very fast acting multiple position rotary switches connecting or controlling multiple input lines called "channels" one at a time to the output.

Referring to FIGS. 17 to 20, a PCIe device 1000 (not shown) may include a first upstream port 1100_1 and a second upstream port 1100_2. In addition, the first upstream port 1100_1 may link up with the first downstream port 2100_1, and the second upstream port 1100_2 may link up with the second downstream port 2100_2 through a link that operates independently of the first upstream port 1100_1. Each of the first upstream port 1100_1 and the second upstream port 1100_2 may include an LTSSM, which controls a status of a link that is physically or logically connected to an LTSSM.

According to an embodiment, the PCIe device 1000 may change an operating mode from a single port mode to a dual port mode in a state in which a link is linked up. Alternatively, the PCIe device 1000 (specifically, a port mode controller thereof) may change the operating mode from a dual port mode to a single port mode in a state where at least one link is linked up. The port mode controller may control the second port to reset the second link in response to a mode change request from the first host to change from the dual port mode to the single port mode.

Figure 17:
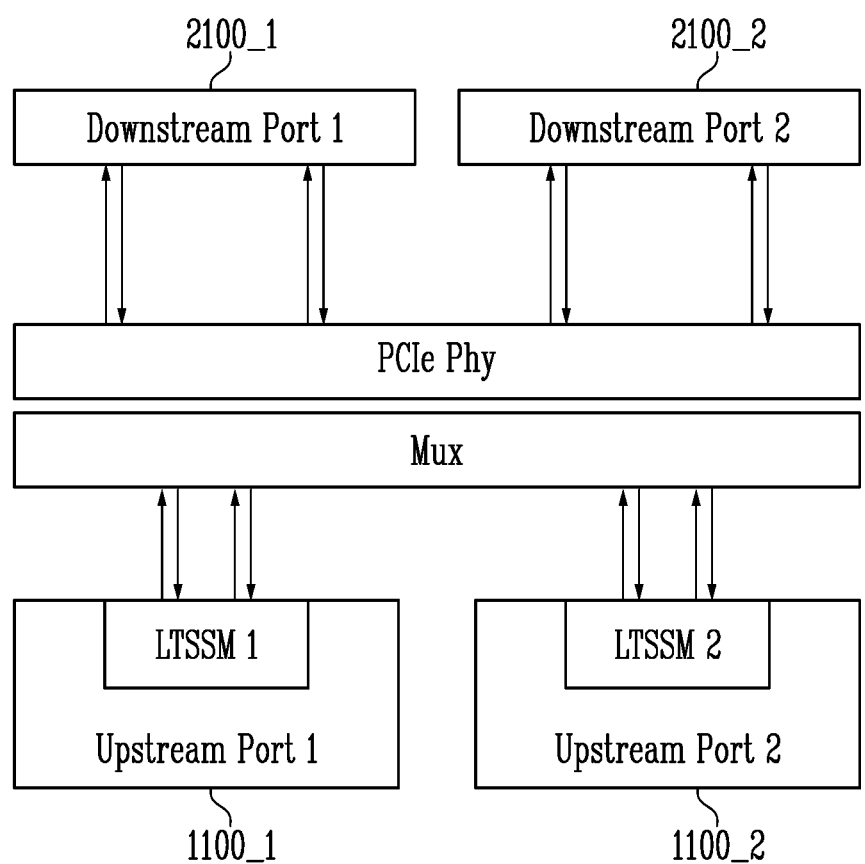
FIG. 17 is a diagram illustrating a dual port mode and a single port mode according to an embodiment of the present disclosure.

Referring to FIG. 17, a dual port mode may be configured such that the first upstream port 1100_1 and the second upstream port 1100_2 of the PCIe device 1000 are connected to the first downstream port 2100_1 and the second downstream port 2100_2, respectively. According to an embodiment, the first downstream port 2100_1 and the second downstream port 2100_2 may be included in one host and realized as independent ports. Alternatively, however, the first downstream port 2100_1 and the second downstream port 2100_2 may be included in different hosts. Referring to FIG. 17, the links connected to the first upstream port 1100_1 and the second upstream port 1100_2 may logically enable data communication.

Figure 18:
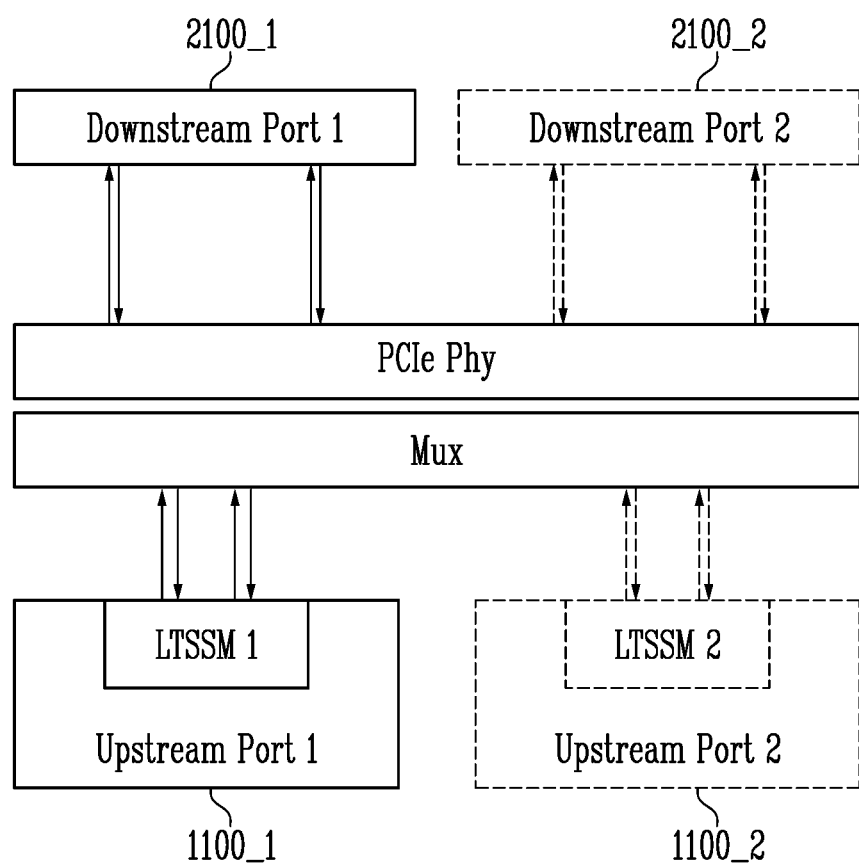
FIG. 18 is a diagram illustrating a dual port mode and a single port mode according to an embodiment of the present disclosure.

Referring to FIG. 18, the first upstream port 1100_1 and the second upstream port 1100_2 of the PCIe device 1000 may configure a single port mode in which data communication using only the first upstream port 1100_1 is possible. More specifically, when the operating mode of the PCIe device 1000 changes from the dual port mode to the single port mode, the link status of the first upstream port 1100_1 may be an L0 state, and the link status of the second upstream port 1100_2 may be in a reset state (e.g., a cold reset, a warm reset, or a hot reset) in which the linked-up link is initialized, or a disabled state in which the linked-up link is disabled. However, when the operating mode of the PCIe device 1000 changes from the single port mode to the dual port mode, the link status of the first upstream port 1100_1 may be the L0 state, and the link status of the second upstream port 1100_2 may be a state in which link training is being performed for link connection. For example, the link status of the second upstream port 1100_2 may be one of the detect state, the polling state, and the configuration state. According to an embodiment, since the link status of the first upstream port 1100_1 is the L0 state, regardless of the link status of the second upstream port 1100_2, the PCIe device 1000 may maintain data communication with the first downstream port 2100_1 using the first upstream port 1100_1.

Figure 19:
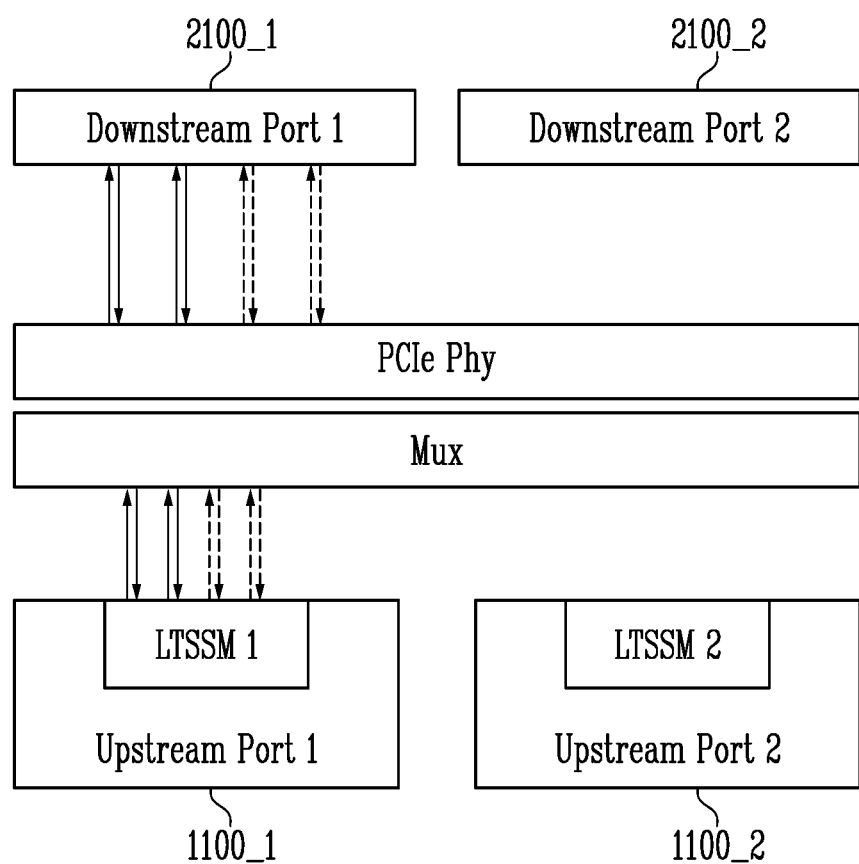
FIG. 19 is a diagram illustrating a dual port mode and a single port mode according to an embodiment of the present disclosure.

Referring to FIG. 19, the first upstream port 1100_1 and the second upstream port 1100_2 of the PCIe device 1000 may operate in a single port mode where data communication using only the first upstream port 1100_1 is possible. More specifically, when the operating mode of the PCIe device 1000 changes from the dual port mode to the single port mode, the first upstream port 1100_1 (or LTSSM 1) may perform an up-configure operation to increase a lane width configuring a link in response to the control of the port mode controller. For example, the first upstream port 1100_1 may increase a lane width of the link connected to the first upstream port 1100_1 from an X2 lane to an X4 lane. More specifically, to configure the link of the first upstream port 1100_1 with the maximum lane width, the first LTSSM 1 may change the link status of the first upstream port 1100_1 sequentially to the L0 state, the recovery state, and the configuration state, and may perform an up-configure operation to increase a lane width in each state.

On the other hand, when the operating mode of the PCIe device 1000 changes from the single port mode to the dual port mode, the first upstream port 1100_1 may perform a lane reduce operation to reduce a lane width configuring a link. For example, the first upstream port 1100_1 may reduce a lane width of the link connected to the first upstream port 1100_1 from an X4 lane to an X2 lane. More specifically, the PCIe device 1000 may reduce the lane width of the first upstream port 1100_1 to change the operating mode from a single port mode in which only the first upstream port 1100_1 operates into a dual port mode in which the first upstream port 1100_1 and the second upstream port 1100_2 operate independently of each other. The first LTSSM 1 may change the link status of the first upstream port 1100_1 sequentially to the L0 state, the recovery state, and the configuration state in a sequential manner, and may perform a lane reduce operation to reduce the lane width in each state.

Figure 20:
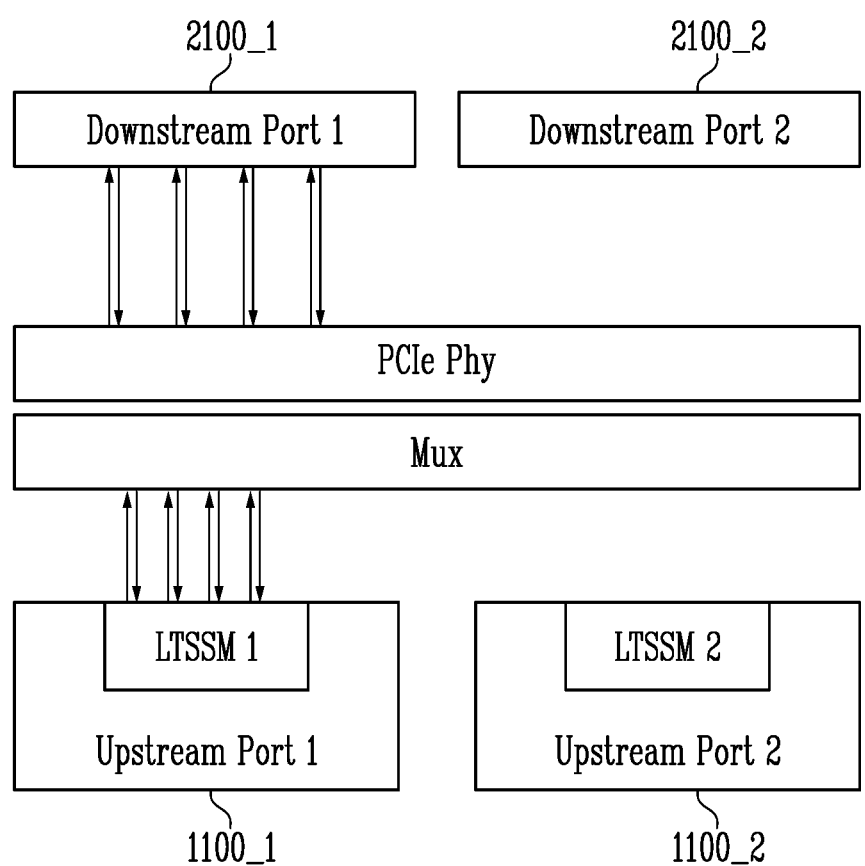
FIG. 20 is a diagram illustrating a dual port mode and a single port mode according to an embodiment of the present disclosure.

Referring to FIG. 20, the first upstream port 1100_1 and the second upstream port 1100_2 of the PCIe device 1000 may configure a single port mode where data communication using only the first upstream port 1100_1 is possible. According to an embodiment, the link connected to the first downstream port 2100_1 may be realized with the maximum lane width. However, according to an embodiment, in a state where the first upstream port 1100_1 and the second upstream port 1100_2 are connected to the same host, if an error occurs in the link connected to the second upstream port 1100_2 or in data communication, then the PCIe device 1000 may accelerate data communication using only the first upstream port 1100_1 until the error is recovered.

Referring to FIGS. 17 to 20, the PCIe device 1000 may receive an operating mode change request from the host to change from a dual port mode to a single port mode. In addition, in response to the operating mode change request from the host, the PCIe device 1000 may change the status of the link connected to the first upstream port 1100_1 and the second upstream port 1100_2 sequentially into the link statuses corresponding to those in FIGS. 8, 9, and 10.

However, referring to FIGS. 17 to 20, the PCIe device 1000 may receive an operating mode change request from the host to change from a dual port mode to a single port mode. In addition, in response to the operating mode change request from the host, the PCIe device 1000 may change the status of the link connected to the first upstream port 1100_1 and the second upstream port 1100_2 sequentially into the link statuses corresponding to those in FIGS. 10, 9, 8, and 7.

Figure 21:
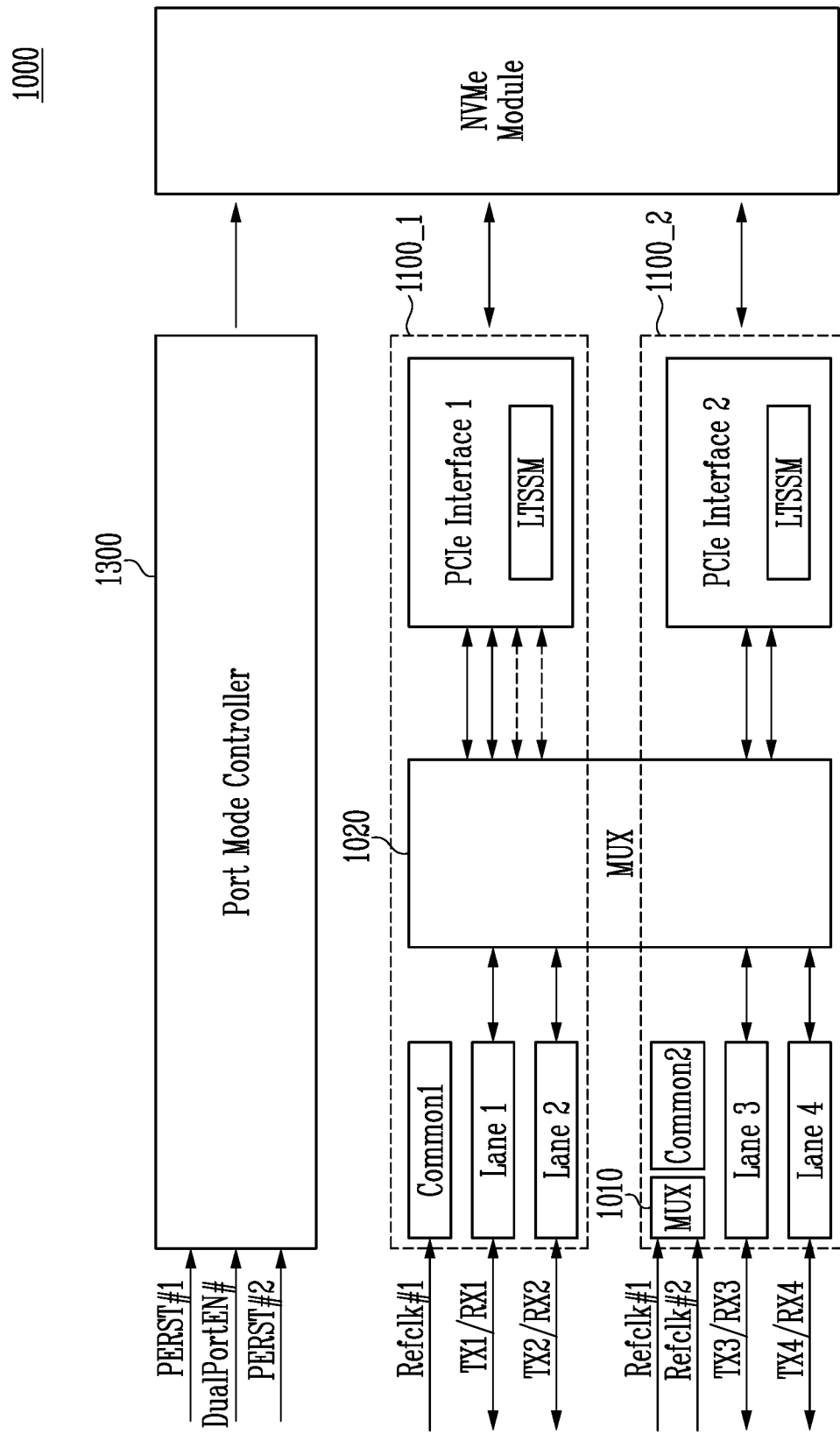
FIG. 21 is a diagram illustrating the configuration of a PCIe device according to an embodiment of the present disclosure.

FIG. 21 is a diagram illustrating the configuration of a PCIe device according to an embodiment of the present disclosure.

Referring to FIG. 21, a PCIe device 1000 may include a first upstream port 1100_1 (also referred as a first port), a second upstream port 1100_2 (also referred as a second port), and a port mode controller 1300. The PCIe device 1000 may perform data communication in a single port mode using only the first upstream port 1100_1. More specifically, the PCIe device 1000 may link up the first upstream port 1100_1 with an external device by using at least one of the first to fourth lanes. FIG. 21 illustrates a PCIe device 1000 having the four lanes, however, PCIe devices contemplated by the disclosure may include more than four lanes.

When the PCIe device 1000 operates in the single port mode using the first to fourth lanes, the port mode controller 1300 may control a first multiplexer (MUX1) 1010 so that the same reference clock may be input to each circuit. More specifically, when the PCIe device 1000 operates in the single port mode, the port mode controller 1300 may control the first multiplexer 1010 so that a first reference clock Refclk #1 may be input to each circuit between the first reference clock Refclk #1 and a second reference clock Refclk #2, which are input to the first multiplexer 1010. In addition, when the PCIe device 1000 operates in the single port mode, the port mode controller 1300 may control a second multiplexer (MUX2) 1020 so that a signal transmitted from the third lane and the fourth lane may be transmitted to a first PCIe interface 1.

In addition, the PCIe device 1000 may perform data communication in the dual port mode using both the first upstream port 1100_1 and the second upstream port 1100_2. The PCIe device 1000 may link up with at least one host using the first upstream port 1100_1 and the second upstream port 1100_2.

When the PCIe device 1000 operates in the dual port mode, the PCIe device 1000 may control an internal circuit using the port mode controller 1300. More specifically, when the PCIe device 1000 operates in the dual port mode, the port mode controller 1300 may control the first multiplexer 1010 so that the first reference clock Refclk #1 may be provided to the first upstream port 1100_1 and the second reference clock Refclk #2, which is different from the first reference clock Refclk #1, may be provided to the second upstream port 1100_2. In addition, when the PCIe device 1000 operates in the dual port mode, the port mode controller 1300 may control the second multiplexer 1020 so that the signal transmitted from the third lane and the fourth lane may be transmitted to a second PCIe interface 2.

The PCIe device 1000 may reset the PCIe interfaces included in the first upstream port 1100_1 and the second upstream port 1100_2, respectively, in response to a first PCIe reset signal PERST #1 and a second PCIe reset signal PERST #2, which are received from the host. In addition, the PCIe device 1000 may change the operating mode to the single port mode or the dual port mode in response to a dual port enable signal DualPortEn # received from the host. More specifically, the port mode controller 1300 may reset the first PCIe interface 1 and the LTSSM included in the first upstream port 1100_1 in response to the first PCIe reset signal PERST #1. The port mode controller 1300 may reset the second PCIe interface 2 and the LTSSM included in the second upstream port 1100_2 in response to the second PCIe reset signal PERST #2.

Figure 22:
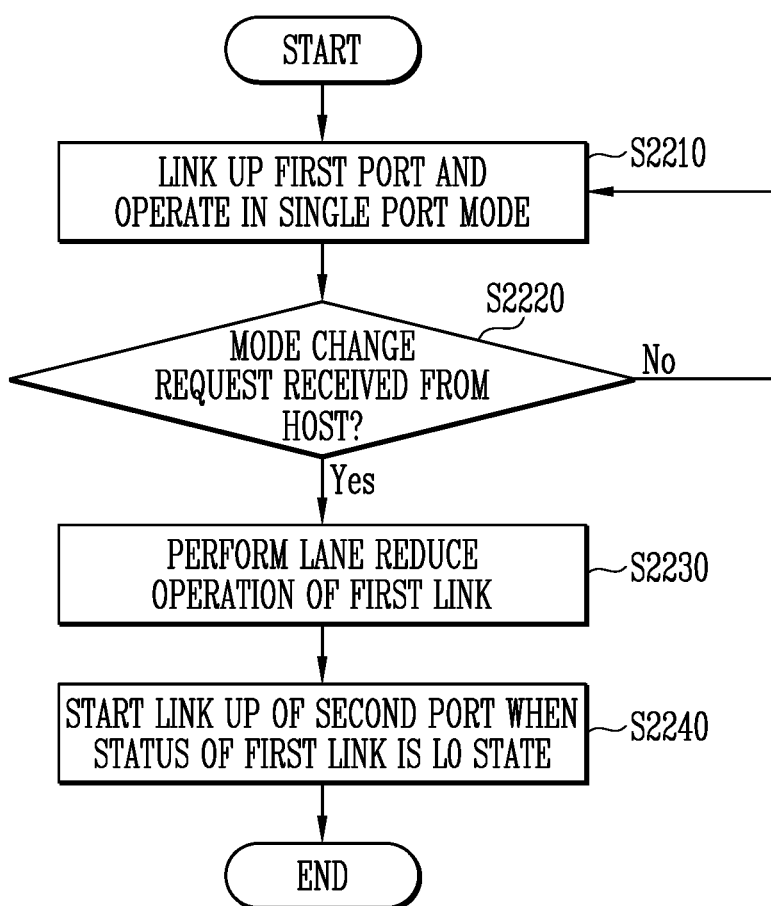
FIG. 22 is a diagram illustrating a method of changing a PCIe device from a single port mode to a dual port mode according to an embodiment of the present disclosure.

FIG. 22 is a diagram illustrating a method of changing a PCIe device from a single port mode to a dual port mode according to an embodiment of the present disclosure.

In FIG. 22, a method of operating a PCIe device 1000 is sequentially illustrated. More specifically, the PCIe device 1000 may include a first port and a second port. In addition, the PCIe device 1000 may link up the first port with a first host and operate in a single port mode at step S2210. More specifically, the PCIe device 1000 may perform a first link training operation to link up the first host with a first link of the first port. The single port mode may refer to a mode in which only the first port operates as between the first and second ports.

In addition, when the PCIe device 1000 receives a mode change request from the host (S2220_YES), the PCIe device 1000 may perform a lane reduce operation of the first link at step S2230. The lane reduce operation may refer to an operation of reducing a lane width (or a link width) corresponding to the first link.

When a status of the first link of the first port becomes an L0 state, the PCIe device 1000 may start a link up of the second port at step S2240. More specifically, when the lane reduce operation of the first port is completed and the status of the first link of the first port returns to the L0 state, the PCIe device 1000 (specifically, a port mode controller thereof) may perform a second link training operation to link up a second link.

In addition, when the second link training operation is completed, the PCIe device 1000 may operate in the dual port mode in which the first port and the second port operate independently of each other. In other words, data communication performed or errors occurring in one of the first and second ports does not influence the operation of the other port. To operate in the dual port mode, each of the first port and the second port may include an LTSSM, a PCIe interface, and the like. The PCIe interface may mean an interface including a transaction layer, a data link layer, and a physical layer, which operate in a status of a link according to PCIe standards in response to the respective control of each of LTSSM 1 and LTSSM 2.

Figure 23:
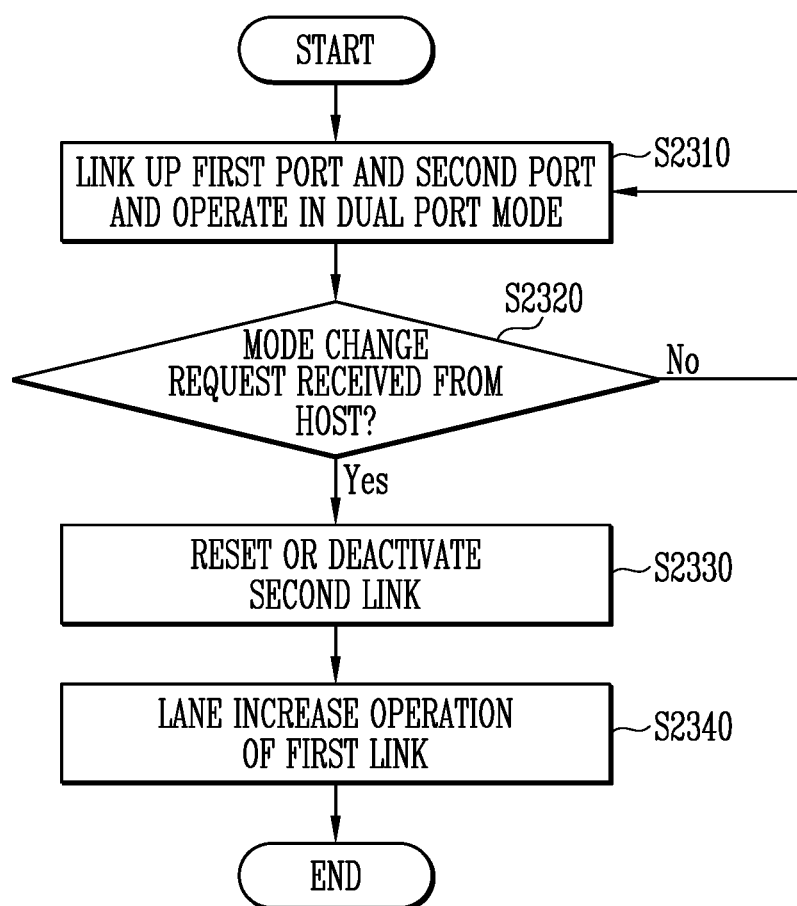
FIG. 23 is a diagram illustrating a method of changing a PCIe device from a dual port mode to a single port mode according to an embodiment of the present disclosure.

FIG. 23 is a diagram illustrating a method of changing a PCIe device from a dual port mode to a single port mode according to an embodiment of the present disclosure.

Referring to FIG. 23, a method of operating a PCIe device 1000 is sequentially illustrated. More specifically, the PCIe device 1000 may include a first port and a second port. In addition, the PCIe device 1000 may link up the first and second ports and operate in a dual port mode at step S2310. More specifically, the PCIe device 1000 may link up the first port with the first host and the second port with the second host. In other words, the PCIe device 1000 may independently perform a first link training operation to link up the first host with a first link of the first port and a second link training operation to link up the second host with a second link of the second port. A link up may refer to an operation of connecting a link to the host logically to make data communication with the host possible. A link training operation may refer to an overall operation to control the settings associated with the corresponding link to perform a link up.

In addition, when the PCIe device 1000 receives a mode change request from the host (S2320_YES), the PCIe device 1000 (specifically, a port mode controller thereof) may control LTSSM 2 to reset or deactivate the second link at step S2330. Reset or deactivation may mean physically or logically disconnecting the link that links up with the host. In addition, according to an embodiment, when the PCIe device 1000 (specifically, a port mode controller thereof) may control the second port to reset or deactivate the second link, the first link may maintain a linked up state (e.g., the L0 state).

In addition, when the reset or the deactivation of the second link is completed, the PCIe device 1000 (specifically, a port mode controller thereof) may control LTSSM 1 to perform a lane increase operation to increase the lane width of the first link at step S2340. When the PCIe device 1000 performs the lane increase operation on the first link, the status of the first link may change sequentially into the L0 state, the recovery state, and the configuration state, and the L0 state. Since data communication is possible logically during the lane increase operation on the first link, the first link may be referenced as in the linked up state.

In addition, when the lane increase operation on the first link is completed, the PCIe device 1000 may operate in a single port mode in which only the first port operates, and the PCIe device 1000 may set the lane width of the first link to the maximum lane width.

According to the present disclosure, a method of operating an improved PCIe device by changing a port mode may be provided in U.S. patent application Ser. No. 17/527,032 filed Nov. 15, 2021 and entitled, "PERIPHERAL COMPONENT INTERCONNECT EXPRESS DEVICE AND OPERATING METHOD THEREOF", the entire disclosure of which is incorporated herein by reference.

Figure 24:
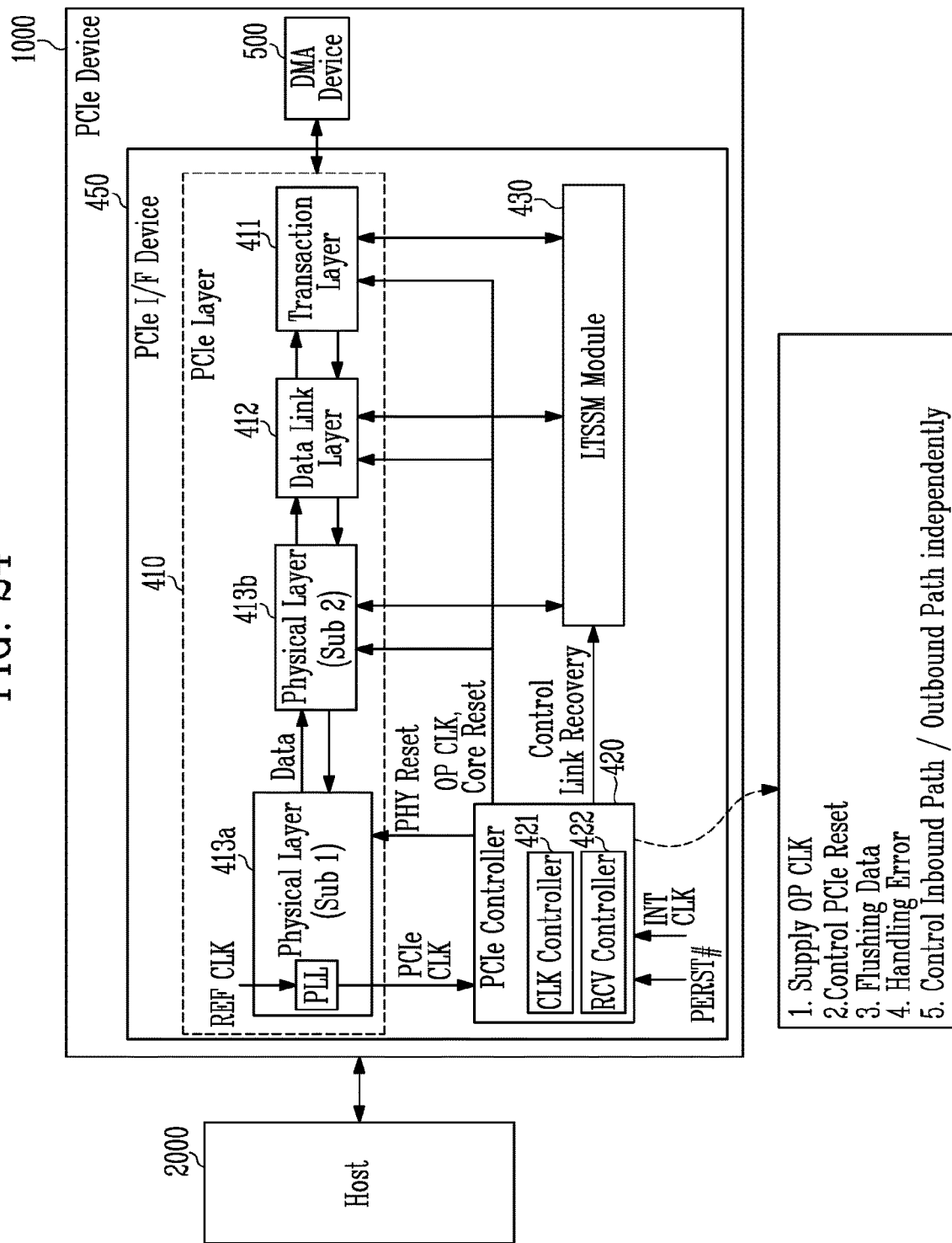
FIG. 24 is a diagram illustrating communication between a PCIe device and a host according to an embodiment of the present disclosure.

FIG. 24 is a diagram illustrating communication between a PCIe device and a host according to an embodiment of the present disclosure.

Referring to FIG. 24, a PCIe device 1000 may include a PCIe interface device 450 and a Direct Memory Access (DMA) device 500. The PCIe device 1000 may include at least one DMA device 500. The DMA device 500 may include a Non-Volatile Memory Express (NVMe) module, an Ethernet card, a sound card, a graphic card, an AI CPU module, and an AI SoC module. The DMA device 500 may include a data communication device that is coupled to the NVMe module, the Ethernet card, the AI CPU module, and the AI SoC module.

The PCIe interface device 450 may perform communication between a host 2000 and the DMA device 500.

The PCIe interface device 450 may transfer a request or data, received from the host 2000, to the DMA device 500. The PCIe interface device 450 may transfer a response or data received from the DMA device 500 to the host 2000.

The PCIe interface device 450 may communicate with the host 2000 through a physical lane.

An upstream port of the PCIe interface device 450 may be coupled to a downstream port of the host 2000 through at least one physical lane. For example, a receiving side RX in the upstream port of the PCIe interface device 450 may be coupled to a transmitting side TX in the downstream port of the host 2000. In a further example, the transmitting side TX in the upstream port of the PCIe interface device 450 may be coupled to the receiving side RX in the downstream port of the host 2000.

The PCIe interface device 450 may receive a reference clock (REF CLK) and a reset signal PERST # from the host 2000. The PCIe interface device 450 may perform communication between the host 2000 and the DMA device 500 on the basis of the reference clock (REF CLK). The PCIe interface device 450 may initialize and set up a link between the host 2000 and the DMA device 500 in response to the reset signal PERST #.

The PCIe interface device 450 may include a PCIe layer 410, a PCIe controller 420, and an LTSSM module 430.

The PCIe layer 410 may perform data communication between the host 2000 and the DMA device 500.

The PCIe layer 410 may include physical layers 413*a* and 413*b*, a data link layer 412, and a transaction layer 411.

The physical layer 413*a* may be an electrical sub-block and be physically coupled to the host 2000 through a lane. The physical layer 413*a* may transmit and receive data to and from the host 2000 through a receiving side RX and a transmitting side TX in a lane. The physical layer 413*a* may include a phase locked loop (PLL) circuit, which generates a PCIe clock (PCIe CLK) on the basis of the reference clock (REF CLK).

The physical layer 413*b* may be a logical sub-block and receive a physical layer packet from the host 2000 through the physical layer 413*a*. The physical layer 413*b* may provide the data link layer 412 with a data link layer packet. The physical layer 413*b* may provide the data link layer 412 with a data link layer packet which includes a data link layer packet included in a received physical layer packet and data included in the physical layer packet.

The physical layer 413*b* may generate a physical layer packet on the basis of the data link layer packet received from the data link layer 412, and may provide the generated physical layer packet to the host 2000 through the physical layer 413*a*. The physical layer 413*b* may operate on the basis of an operating clock (OP CLK) provided from the PCIe controller 420.

The data link layer 412 may receive a data link layer packet from the physical layer 413*b*, and may provide the transaction layer 411 with a transaction layer packet in a received data link layer packet and data included in the data link layer packet. The data link layer 412 may generate a data link layer packet based on a transaction layer packet received from the transaction layer 411 and may provide the generated data link layer packet to the physical layer 413*b*. The data link layer 412 may operate on the basis of the operating clock (OP CLK) provided from the PCIe controller 420.

The transaction layer 411 may receive a transaction layer packet from the data link layer 412 and may provide the DMA device 500 with a data payload included in the received transaction layer packet. The transaction layer 411 may generate a transaction layer packet based on the data payload received from the DMA device 500 and may provide the generated transaction layer packet to the data link layer 412. The transaction layer 411 may operate on the basis of the operating clock (OP CLK) provided from the PCIe controller 420.

According to an embodiment, the PCIe controller 420 may include a clock controller 421 and a recovery controller 422.

The clock controller 421 may set the operating clock (OP CLK) on the basis of the PCIe clock (PCIe CLK) received from the physical layer 413a or an internal clock (INT CLK) of the PCIe device. The clock controller 421 may provide the operating clock (OP CLK) to the PCIe layer 410.

The clock controller 421 may switch the operating clock (OP CLK) from the PCIe clock (PCIe CLK) to the internal clock (INT CLK) when the reset signal PERST # is asserted from a first state to a second state, or the reference clock (REF CLK) is off.

When a DMA device 500 is idle with respect to a transaction, the clock controller 421 may roll back the operating clock (OP CLK) from the internal clock (INT CLK) to the PCIe clock (PCIe CLK). When the DMA device 500 is busy or active with a transaction, if the reset signal PERST # releases from the second state to the first state, or if the reference clock (REF CLK) is on, then the clock controller 421 may roll back the operating clock (OP CLK) from the internal clock (INT CLK) to the PCIe clock (PCIe CLK).

According to an embodiment, the reset signal PERST # may have a logic value of 0 in the first state and a logic value of 1 in the second state. According to another embodiment, the reset signal PERST # may have a logic value of 1 in the first state and a logic value of 0 in the second state. However, the logic value of the reset signal PERST # in the first and second states may not be limited to this embodiment, but may vary in other embodiments.

The recovery controller 422 may flush data of the PCIe layer 410.

The recovery controller 422 may transact with the DMA device 500. A transaction may be a series of sequences in which requests and responses are transmitted and received between the recovery controller 422 and the DMA device 500. The recovery controller 422 may provide the DMA device 500 with an error response to a request received from the DMA device 500. When error response processing of the DMA device 500 is completed, and an additional request is not received from the DMA device 500, then recovery controller 422 may determine that a transaction with respect to the DMA device 500 is idle.

The recovery controller 422 may reset the PCIe layer 410. When a PCIe reset signal is asserted and a reset of the PCIe layer 410 is completed, the recovery controller 422 may release the PCIe reset signal. The PCIe reset signal may be an internal reset signal of the PCIe interface device 450 that is differentiated from a reset signal PERST # received from the host 2000. The PCIe reset signal may include a PHY reset signal for resetting the physical layer 413a and a core reset signal for resetting the data link layer 412 and the transaction layer 411.

According to an embodiment, when a transaction with respect to the DMA device 500 is idle, the recovery controller 422 may assert a PCIe reset signal. When a reset of the PCIe layer 410 is completed, the recovery controller 422 may wait until the reset signal PERST # is released or the reference clock is on. When the reset signal PERST # is released or the reference clock (REF CLK) is on, the recovery controller 422 may release the PCIe reset signal. After the PCIe reset signal is released, the recovery controller 422 may control the LTSSM module 430 to perform a link recovery operation with respect to the host 2000.

According to an embodiment, when the transaction with respect to the DMA device 500 is busy or active, if the reset signal PERST # is released or the reference clock REF CLK is on, then the recovery controller 422 may block the transaction with respect to the DMA device 500. The recovery controller 422 may assert the PCIe reset signal after blocking the transaction with respect to the DMA device 500. The recovery controller 422 may release the PCIe reset signal when a reset of the PCIe layer 410 is completed. After the PCIe reset signal is released, the recovery controller 422 may control the LTSSM module 430 to perform a link recovery operation with respect to the host 2000. When link training is initiated in the link recovery operation, the recovery controller 422 may release the blocked transaction. The recovery controller 422 may flush residual data of the PCIe layer 410 and may provide the error response to the DMA device 500 in association with the transaction with respect to the DMA device 500.

The recovery controller 422 may independently control an outbound access to the host 2000 and an inbound access to the DMA device 500 of the host 2000. Therefore, although the outbound access is limited because the transaction with respect to the DMA device 500 is not completed, the recovery controller 422 may allow the inbound access to the DMA device 500 from the host 2000 when a link up is established in a link recovery operation.

According to an embodiment, even when the transaction with respect to the DMA device 500 is busy, if the reset signal PERST # is released or the reference clock (REF CLK) is on, then the PCIe layer 410 may be reset immediately, and the link recovery operation for the host 2000 may be initiated, thereby achieving the Quality of Service (QoS) for a link recovery time on the PCIe specifications.

Figure 25:
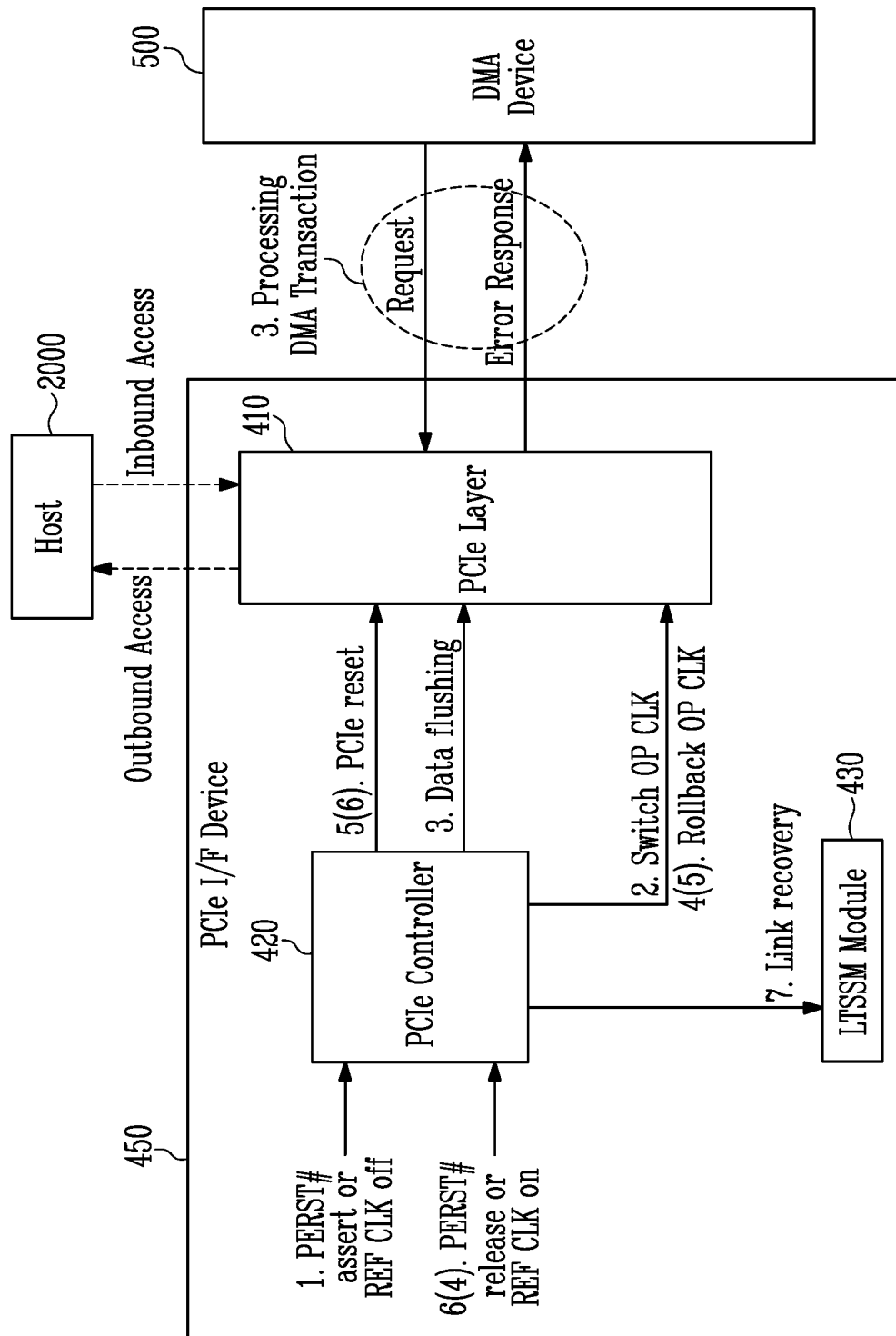
FIG. 25 is a diagram illustrating the configuration and operations of a PCIe interface device according to an embodiment of the present disclosure.

FIG. 25 is a diagram illustrating the configuration and operations of a PCIe interface device according to an embodiment of the present disclosure.

Referring to FIG. 25, a PCIe interface device 450 may include a PCIe layer 410, a PCIe controller 420, and an LTSSM module 430.

The PCIe layer 410 may perform communication between the host 2000 and the DMA device 500. The PCIe layer 410 may include a physical layer, a data link layer, and a transaction layer. The DMA device 500 may include a Non-Volatile Memory Express (NVMe) module, an Ethernet card, a sound card, a graphic card, and the like.

According to an embodiment, the PCIe controller 420 may detect whether the reset signal PERST # is asserted or the reference clock (REF CLK) is off.

When the reset signal PERST # is asserted or the reference clock REF CLK is off, the PCIe controller 420 may switch the operating clock of the PCIe layer 410 from the PCIe clock to the internal clock of the PCIe interface device 450. The PCIe clock may be generated by a phase locked loop (PLL) circuit in the PCIe layer 410 on the basis of the reference clock (REF CLK) received from the host 2000.

The PCIe controller 420 may flush data of the PCIe layer 410. The PCIe controller 420 may process a transaction with respect to the DMA device 500 through the PCIe layer 410. When the error response processing of the DMA device 500 is completed, the PCIe controller 420 may determine that the transaction is idle with respect to the DMA device 500.

The PCIe controller 420 may roll back the operating clock of the PCIe layer 410 from internal clock to the PCIe clock when the transaction with respect to the DMA device 500 is idle.

The PCIe controller 420 may reset the PCIe layer 410 when the operating clock is rolled back to the PCIe clock.

After the PCIe layer 410 is reset, the PCIe controller 420 may detect whether the reset signal PERST # is released or the reference clock (REF CLK) is on.

When the reset signal PERST # is released or the reference clock (REF CLK) is on, the PCIe controller 420 may control the LTSSM module 430 to perform a link recovery operation on the host 2000.

According to an embodiment, the PCIe controller 420 may detect whether the reset signal PERST # is asserted or the reference clock (REF CLK) is off.

When the reset signal PERST # is asserted or the reference clock (REF CLK) is off, the PCIe controller 420 may switch an operating clock of the PCIe layer 410 from the PCIe clock to the internal clock of the PCIe interface device 450.

The PCIe controller 420 may flush data of the PCIe layer 410. The PCIe controller 420 may process the transaction with respect to the DMA device 500 through the PCIe layer 410. When the error response processing of the DMA device 500 is completed, the PCIe controller 420 may determine that the transaction is idle with respect to the DMA device 500.

When the transaction with respect to the DMA device 500 is busy, the PCIe controller 420 may detect whether the reset signal PERST # is released or the reference clock (REF CLK) is on.

When the PCIe controller 420 detects that the reset signal PERST # is released or the reference clock (REF CLK) is on, the PCIe controller 420 may roll back the operating clock of the PCIe layer 410 from the internal clock to the PCIe clock.

The PCIe controller 420 may reset the PCIe layer 410 when the operating clock is rolled back.

The PCIe controller 420 may control the LTSSM module 430 to perform a link recovery operation with respect to the host 2000 when the PCIe layer 410 is reset.

Processing a transaction with respect to the DMA device 500 may be on hold when the reset signal PERST # is released or the reference clock (REF CLK) is on, and may be resumed when the link training in the link recovery operation starts.

Figure 26:
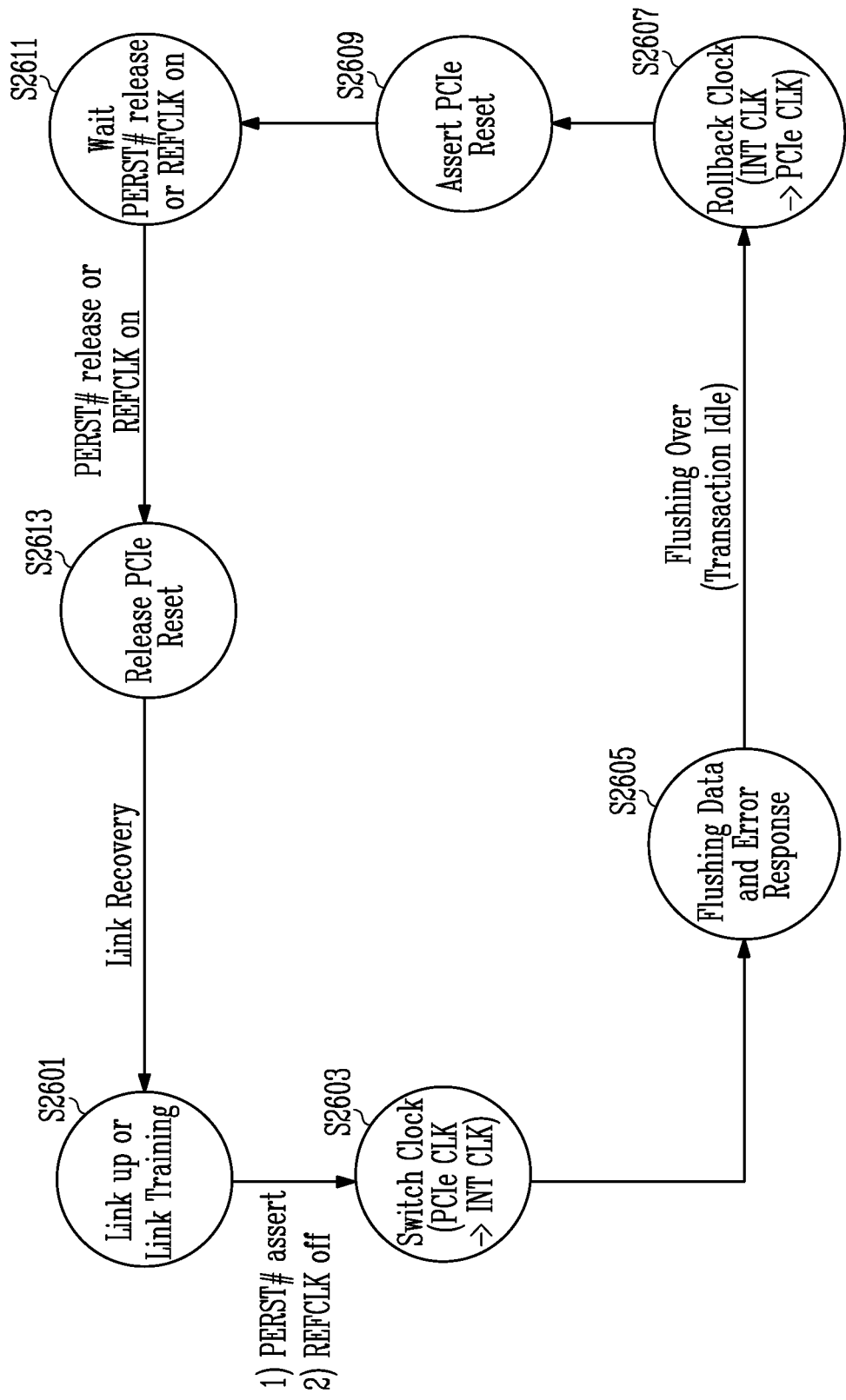
FIG. 26 is a diagram illustrating operations of a PCIe interface device according to an embodiment of the present disclosure.

FIG. 26 is a diagram illustrating operations of a PCIe interface device according to an embodiment of the present disclosure.

Referring to FIG. 26, at step S2601, a link with respect to a host may be in a link up state or a link training state. When the reset signal PERST # is asserted or the reference clock (REF CLK) is off, step S2601 may transition to step S2603.

At step S2603, the operating clock of the PCIe layer may switch from the PCIe clock (PCIe CLK) to the internal clock (INT CLK).

At step S2605, data in the PCIe layer may be flushed, or error response processing of a request received from the DMA device may be performed. When the error response processing of the request received from the DMA device is completed, if a new request is not received, then a transaction with respect to the DMA device may be determined as idle, and step S2605 may transition to step S2607.

At step S2607, the operating clock of the PCIe layer may roll back from the internal clock (INT CLK) to the PCIe clock (PCIe CLK).

At step S2609, the PCIe reset signal may be asserted.

At step S2611, waiting occurs until the reset signal PERST # is released or the reference clock (REF CLK) is on. When the reset signal PERST # is released or the reference clock (REF CLK) is on, step S2611 may transition to step S2613.

At step S2613, the PCIe reset signal may be released. When PCIe reset is completed, the link recovery operation may be performed, and step S2613 may transition to step S2601. The link with respect to the host may enter link training or the link up state as described above with reference to FIG. 3.

Figure 27:
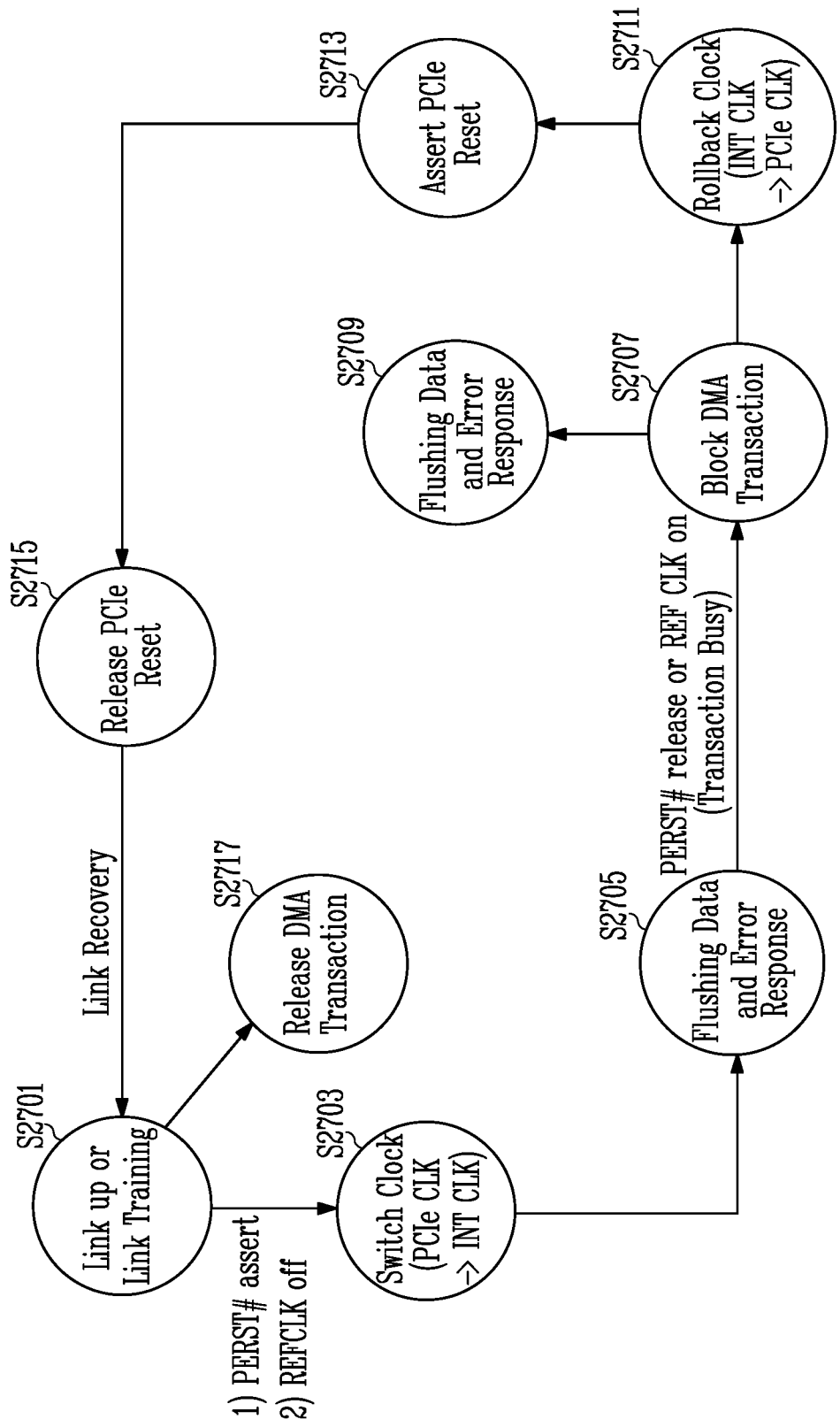
FIG. 27 is a diagram illustrating operations of a PCIe interface device according to an embodiment of the present disclosure.

FIG. 27 is a diagram illustrating operations of a PCIe interface device according to an embodiment of the present disclosure.

Referring to FIG. 27, at step S2701, a link with respect to a host may be in a link up state or a link training state. When the reset signal PERST # is asserted or the reference clock (REF CLK) is off, step S2701 may transition to step S2703.

At step S2703, the operating clock of the PCIe layer may switch from the PCIe clock (PCIe CLK) to the internal clock (INT CLK).

At step S2705, data in the PCIe layer may be flushed, or error response processing of a request received from the DMA device may be carried out. When the error response processing of the request received from the DMA device is completed, and if a new request is not received, then, a transaction with respect to the DMA device may be determined as idle.

When the transaction is busy, if the reset signal PERST # is released or the reference clock (REF CLK) is on, then step S2705 may transition to step S2707.

At step S2707, the transaction with respect to the DMA device may be blocked.

At step S2709, when the transaction is blocked, flushing residual data and error response processing may be carried out while the transaction is blocked.

At step S2711, the operating clock of the PCIe layer may roll back from the internal clock (INT CLK) to the PCIe clock (PCIe CLK).

At step S2713, the PCIe reset signal may be asserted.

At step S2715, the PCIe reset signal may be released. When PCIe reset is completed, the link recovery operation may be performed, and step S2715 may transition to step S2701. The link with respect to the host may enter the link training or the link up state as described above with reference to FIG. 3.

At step S2717, when link training is entered in the link recovery operation, the blocked DMA transaction may be released.

Figure 28:
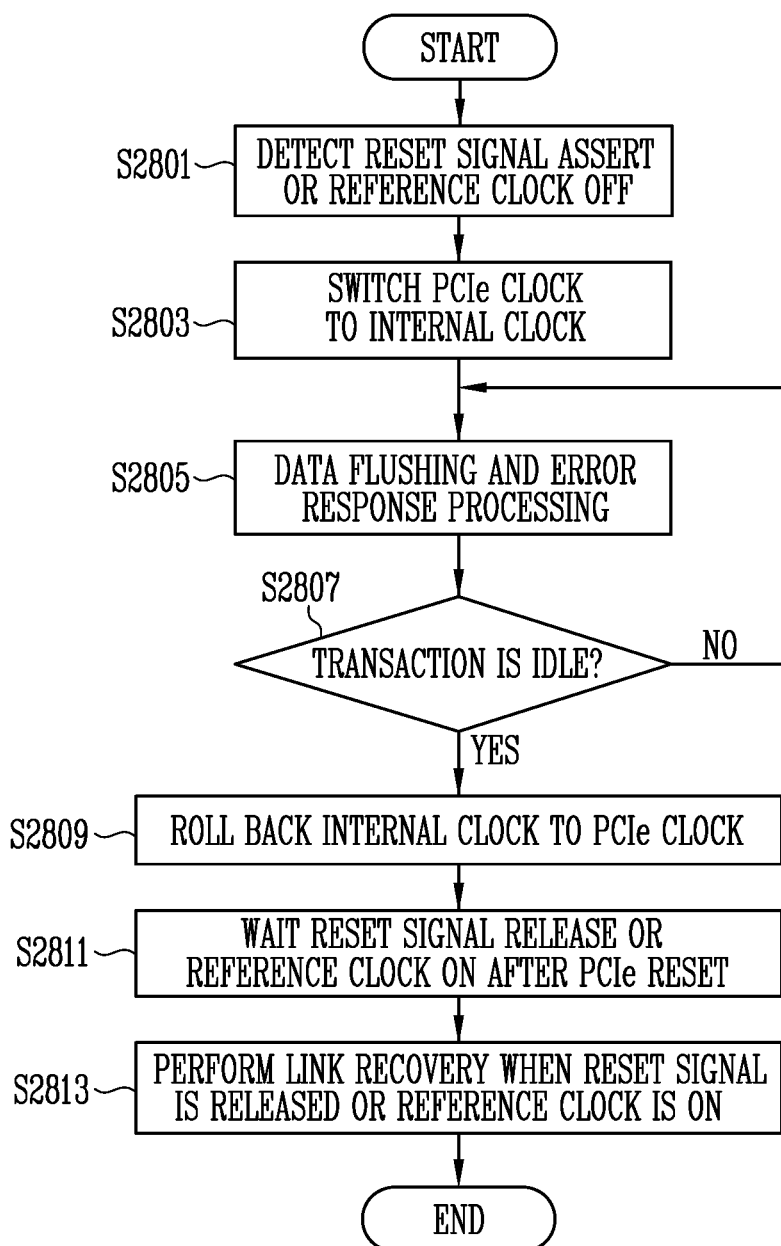
FIG. 28 is a flow chart illustrating operations of a PCIe interface device according to an embodiment of the present disclosure.

FIG. 28 is a flow chart illustrating operations of a PCIe interface device according to an embodiment of the present disclosure.

Referring to FIG. 28, at step S2801, the PCIe interface device may detect whether a reset signal received from the host is asserted or the reference clock is off.

At step S2803, the PCIe interface device may switch an operating clock from a PCIe clock, generated based on a reference clock, to an internal clock.

At step S2805, the PCIe interface device may flush data in the PCIe layer, or may perform error response processing of a request received from the DMA device.

At step S2807, the PCIe interface device may determine whether a transaction with respect to the DMA device is idle or not. As a result of determination, when the transaction is idle, the process may proceed to step S2809, and if the transaction is busy, the process may proceed to step S2805. When the error response processing of the request received from the DMA device is completed, and a new request is not received, the PCIe interface device may determine the transaction with respect to the DMA device as idle.

At step S2809, the PCIe interface device may roll back the operating clock from the internal clock to the PCIe clock.

At step S2811, the PCIe interface device may reset the PCIe layer, and may wait until a release of the reset signal is received from the host or the reference clock is on.

At step S2813, the PCIe interface device may perform a link recovery operation on the host when the reset signal is released or the reference clock is on.

Figure 29:
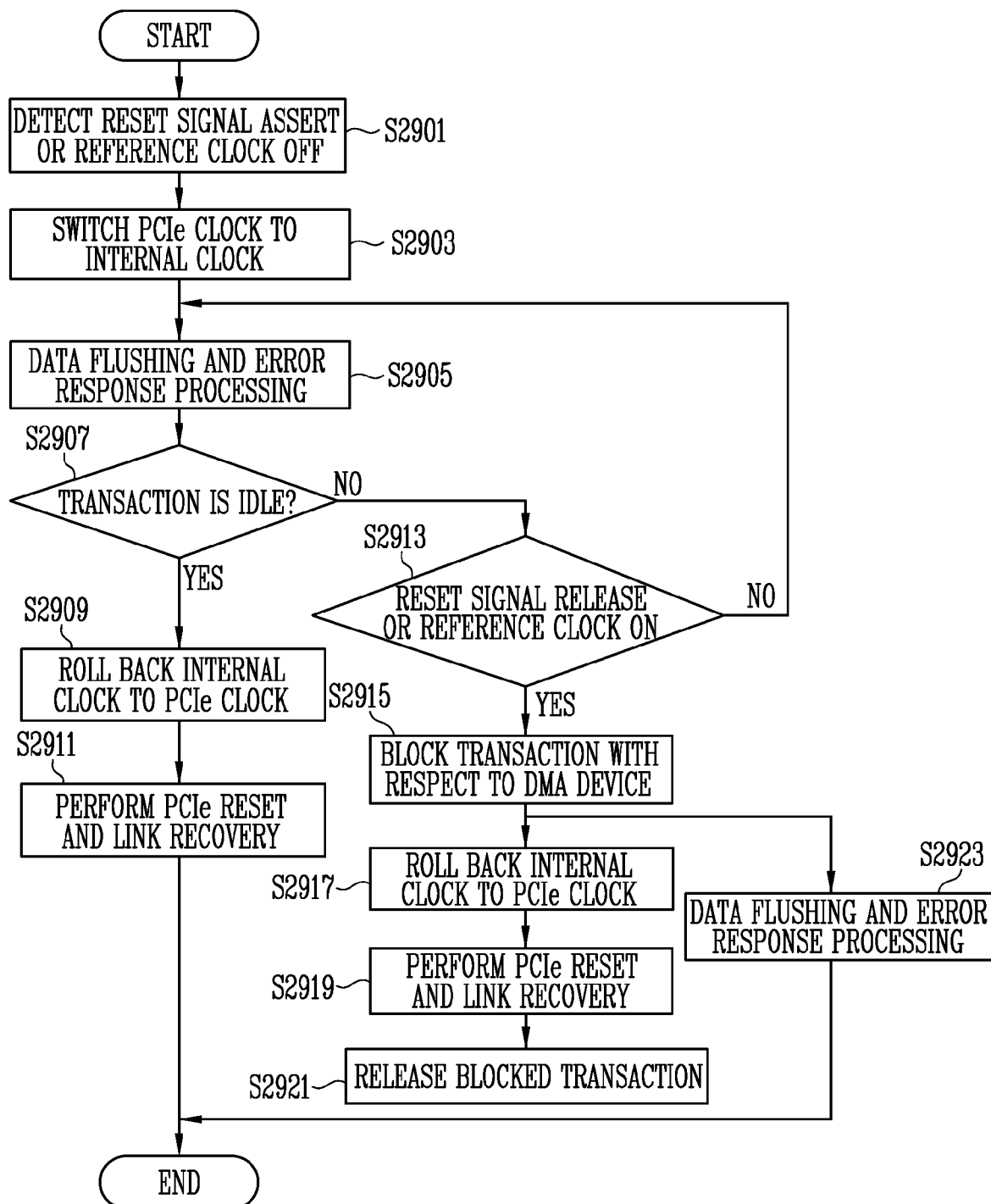
FIG. 29 is a flow chart illustrating operations of a PCIe interface device according to an embodiment of the present disclosure.

FIG. 29 is a flow chart illustrating operations of a PCIe interface device according to an embodiment of the present disclosure.

Referring to FIG. 29, at step S2901, the PCIe interface device may detect whether a reset signal received from the host is asserted or the reference clock is off.

At step S2903, the PCIe interface device may switch an operating clock from a PCIe clock, generated based on a reference clock, to an internal clock.

At state S2905, the PCIe interface device may flush data in the PCIe layer, or may carry out error response processing of a request received from the DMA device.

At step S2907, the PCIe interface device may determine whether a transaction with respect to the DMA device is idle or not. As a result of determination, if the transaction is idle, the process may proceed to step S2909, and if the transaction is busy, the process may proceed to step S2913. When the error response processing of the request received from the DMA device is completed, and a new request is not received, the PCIe interface device may determine the transaction with respect to the DMA device as idle.

At step S2909, the PCIe interface device may roll back the operating clock from the internal clock to the PCIe clock.

At step S2911, the PCIe interface device may reset the PCIe layer and may perform a link recovery operation on the host. Step S2911 may correspond to step S2811 and step S2813 of FIG. 28.

At step S2913, the PCIe interface device may determine whether the reset signal is released or the reference clock is on. As a result of determination, when the reset signal is released or the reference clock is on, the process may proceed to step S2915, and if the reset signal is asserted and the reference clock is off, the process may proceed to step S2905.

At step S2915, the PCIe interface device may block a transaction with respect to the DMA device.

At step S2917, the PCIe interface device may roll back the operating clock from the internal clock to the PCIe clock.

At step S2919, the PCIe interface device may reset the PCIe layer and may perform the link recovery operation on the host.

At step S2921, the PCIe interface device may release the blocked transaction when link training starts in the link recovery operation.

At step S2923, the PCIe interface device may flush residual data and process an error response when the transaction with respect to the DMA device is blocked.

According to the present disclosure, a PCIe interface device having improved link recovery performance and an operating method thereof may be provided in U.S. patent application Ser. No. 17/526,995 filed Nov. 15, 2021 and entitled, "PERIPHERAL COMPONENT INTERCONNECT EXPRESS INTERFACE DEVICE AND OPERATING METHOD THEREOF", the entire disclosure of which is incorporated herein by reference.

In the above-discussed embodiments, all states may be selectively performed or skipped. In an embodiment, the states in each embodiment may not always be performed in regular order. Furthermore, the embodiments disclosed in the present specification and the drawings aim to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure. It will be apparent to those skilled in the art that various modifications can be made to the above-described exemplary embodiments of the present disclosure without departing from the spirit or scope of the invention. Thus, it is intended that the present disclosure cover all such modifications provided they come within the scope of the appended claims and their equivalents.

What is claimed is:

1. A Peripheral Component Interconnect Express (PCIe) interface device, comprising:
    a PCIe layer configured to perform communication between a host and a Direct Memory Access (DMA) device;
    a link training module configured to perform a link training for the host;
    a PCIe register configured to store data information on the PCIe layer; and
    a PCIe controller configured to switch an operating clock from a PCIe clock, generated based on a reference clock, to an internal clock, process data of the PCIe layer on the basis of the internal clock, and control the link training module to recover a link for the host, when a reset signal received from the host is asserted or the reference clock is off.

2. The PCIe interface device of claim 1, wherein the PCIe controller comprises:
    a clock controller configured to switch the operating clock from the PCIe clock to the internal clock when the reset signal is asserted or the reference clock is off; and
    a recovery controller configured to flush data of the PCIe layer, process a transaction for the DMA device, reset the PCIe layer, and control the link training module to recover the link for the host on the basis of the internal clock.

3. The PCIe interface device of claim 2, wherein the clock controller rolls back the operating clock from the internal clock to the PCIe clock based on whether the transaction for the DMA device is idle or whether the reset signal is released.

4. The PCIe interface device of claim 3, wherein the clock controller rolls back the operating clock from the internal clock to the PCIe clock when the transaction for the DMA device is idle.

5. The PCIe interface device of claim 3, wherein the clock controller rolls back the operating clock from the internal clock to the PCIe clock when the transaction for the DMA device is busy and the reset signal is released.

6. The PCIe interface device of claim 2, wherein the recovery controller provides the DMA device with an error response to a request received from the DMA device.

7. The PCIe interface device of claim 2, wherein the recovery controller resets the PCIe layer based on whether the transaction for the DMA device is idle or whether the reset signal is released.

8. The PCIe interface device of claim 1, wherein the PCIe layer comprises a physical layer, a data link layer and a transaction layer, and
    wherein the link training module resets or maintains the data information based on whether a link down caused by a failure of the link training is a host link down requested by the host.

9. The PCIe interface device of claim 8, wherein the link training module resets the data information in response to the host link down and maintains the data information in response to a sudden link down not requested by the host.

10. The PCIe interface device of claim 9, the link training module resets the physical layer and maintains the transaction layer and the data link layer in response to the sudden link down.

11. The PCIe interface device of claim 9, further comprising a replay buffer configured to store transaction packets to re-transmit the transaction packets being processed in the transaction layer,
wherein the link training module resets the replay buffer in response to the sudden link down.

12. The PCIe interface device of claim 9, wherein the DMA device comprises a NVMe (non-volatile memory express) module, and
wherein the link training module maintains resister values of the NVMe module in response to the sudden link down.

13. The PCIe interface device of claim 9, wherein the link training module sets a link up register value corresponding a plurality of states of the link, and
wherein the plurality of states of the link includes a detect state, a polling state, a configuration state, a L0 state, a L0s state, a L1 state, a L2 state, a recovery state, a loopback state, a hot reset state and a disabled state.

14. The PCIe interface device of claim 13, wherein the link training module sets the link up register value as a first value when the link is link up state and as a second value when the link is link down state.

15. The PCIe interface device of claim 14, the link training module determines whether the link down is the host link down or the sudden link down based on a first state and a second state when, according to a change of the link from the first state to the second state, the link up register value is transitioned from the first value to the second value.

16. The PCIe interface device of claim 15, the link training module determines the link down as the host link down when the first state is one of the loopback state, the hot reset state, and the disabled state.

17. The PCIe interface device of claim 15, the link training module determines the link down as the host link down when the second state is the detect state and the first state is one of the L2 state, the hot reset state, and the disabled state.

18. The PCIe interface device of claim 15, the link training module determines the link down as the sudden link down when the second state is the detect state and the first state is one of the configuration state and the recovery state.

19. A Peripheral Component Interconnect Express (PCIe) device, comprising:
a first port configured to communicate with a first host through a first link;
a second port configured to communicate with the first host or a second host through a second link; and
a port mode controller configured to control the first port and the second port to change an operating mode between a single port mode in which only the first port operates and a dual port mode in which the first port and the second port operate independently of each other,
wherein the port mode controller controls the second port to perform a link training for linking up the second link or to reset the second link in a state where the first link is linked up.

20. The PCIe device of claim 19, wherein the port mode controller controls, in response to a first mode change request received from the first host to change from the dual port mode to the single port mode, the second port to reset the second link and the first port to extend a lane width of the first link after the second link is reset.

21. The PCIe device of claim 20, wherein the second port includes a PCIe interface device, and
wherein the PCIe interface device comprises:
a PCIe layer configured to form the second link with the second host; and
a PCIe controller configured to switch an operating clock from a PCIe clock, generated based on a reference clock, to an internal clock, and process data of the PCIe layer on the basis of the internal clock when a reset signal received from the second host is asserted.

22. The PCIe device of claim 21, wherein the port mode controller controls, in response to a second mode change request received from the first host to change from the single port mode to the dual port mode, the first port to reduce the lane width of the first link and the second port to perform the link training after the lane width is reduced.

23. The PCIe device of claim 22, wherein the PCIe controller flushes the data of the PCIe layer, resets the PCIe layer, and perform the link training for recovering the second link in response to the second mode change request.

* * * * *